US009602938B2

(12) United States Patent
Goldstein et al.

(10) Patent No.: US 9,602,938 B2
(45) Date of Patent: *Mar. 21, 2017

(54) SOUND LIBRARY AND METHOD

(71) Applicant: Personics Holdings, LLC, Boca Raton, FL (US)

(72) Inventors: Steven Goldstein, Delray Beach, FL (US); Marc Boillot, Plantation, FL (US); Gary Hoshizaki, Boca Raton, FL (US); John P Keady, Fairfax, VA (US)

(73) Assignee: Personics Holdings, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,838

(22) Filed: Feb. 1, 2016

(65) Prior Publication Data

US 2016/0150333 A1    May 26, 2016

Related U.S. Application Data

(63) Continuation of application No. 12/560,074, filed on Sep. 15, 2009, now Pat. No. 9,253,560.

(Continued)

(51) Int. Cl.
*H04R 29/00* (2006.01)
*G06F 17/30* (2006.01)
(Continued)

(52) U.S. Cl.
CPC ............. *H04R 29/00* (2013.01); *G06F 3/165* (2013.01); *G06F 17/30743* (2013.01);
(Continued)

(58) Field of Classification Search
CPC ...... H04R 1/1083; H04R 1/083; H04R 29/00; H04R 2499/11; G06F 17/30743;
(Continued)

(56) References Cited

U.S. PATENT DOCUMENTS

2004/0122672 A1\* 6/2004 Bonastre ................. G10L 15/12
704/256.7
2006/0031486 A1\* 2/2006 Miner ............... G06F 17/30864
709/224

(Continued)

*Primary Examiner* — Vivian Chin
*Assistant Examiner* — William A Jerez Lora
(74) *Attorney, Agent, or Firm* — Pablo Meles

(57) ABSTRACT

At least one exemplary embodiment is directed to an electronic device configured to collect acoustic information or a method including the steps of collecting acoustic data by a microphone communicatively coupled to a mobile device, analyzing the acoustic data for a sound signature, tagging the sound signature with metadata, sending the sound signature with metadata to an acoustic database, associating sounds within the acoustic data with information, presenting the information on a map on the mobile device, and accessing at least audio from the acoustic database when a cursor is placed over a specific location on the map corresponding to captured ambient sounds from a geographic location and wherein acoustic information can be retrieved corresponding to the geographic location and for different selected periods of time.

20 Claims, 28 Drawing Sheets

Related U.S. Application Data

(60) Provisional application No. 61/097,396, filed on Sep. 16, 2008.

(51) Int. Cl.

| | |
|---|---|
| *H04R 1/10* | (2006.01) |
| *G06F 3/16* | (2006.01) |
| *G06T 17/05* | (2011.01) |
| *G10L 15/22* | (2006.01) |
| *G11B 20/10* | (2006.01) |
| *H04R 1/08* | (2006.01) |
| *H04M 1/60* | (2006.01) |
| *H04M 1/725* | (2006.01) |

(52) U.S. Cl.
CPC .. *G06F 17/30749* (2013.01); *G06F 17/30752* (2013.01); *G06T 17/05* (2013.01); *G10L 15/22* (2013.01); *G11B 20/10527* (2013.01); *H04R 1/083* (2013.01); *H04R 1/1083* (2013.01); *G10L 2015/223* (2013.01); *G11B 2020/10546* (2013.01); *H04M 1/6066* (2013.01); *H04M 1/72569* (2013.01); *H04M 1/72572* (2013.01); *H04M 2250/10* (2013.01); *H04M 2250/12* (2013.01); *H04R 2499/11* (2013.01)

(58) Field of Classification Search
CPC .......... G06F 17/30749; H04M 1/6066; H04M 1/72569; H04M 1/72572; H04M 2250/10; H04M 2250/12
USPC ................ 381/14, 26, 56, 58, 380; 340/952; 709/203
See application file for complete search history.

(56) References Cited

U.S. PATENT DOCUMENTS

| | | | |
|---|---|---|---|
| 2007/0257782 A1* | 11/2007 | Etcheson | G07C 5/008 340/425.5 |
| 2008/0243501 A1* | 10/2008 | Hafsteinsson | G10L 15/265 704/235 |
| 2009/0220109 A1* | 9/2009 | Crockett | H03G 3/3089 381/107 |
| 2010/0049072 A1* | 2/2010 | Syeda-Mahmood | A61B 7/00 600/528 |

* cited by examiner

Fig. 15a
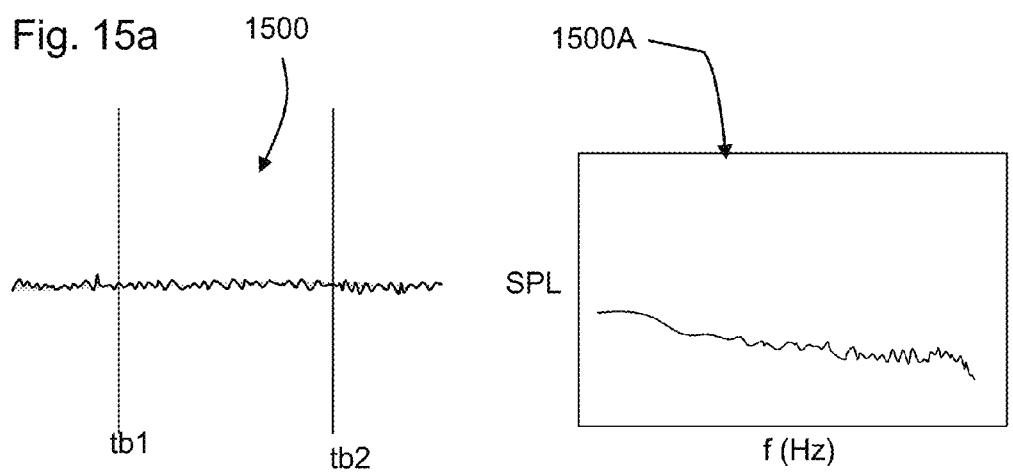
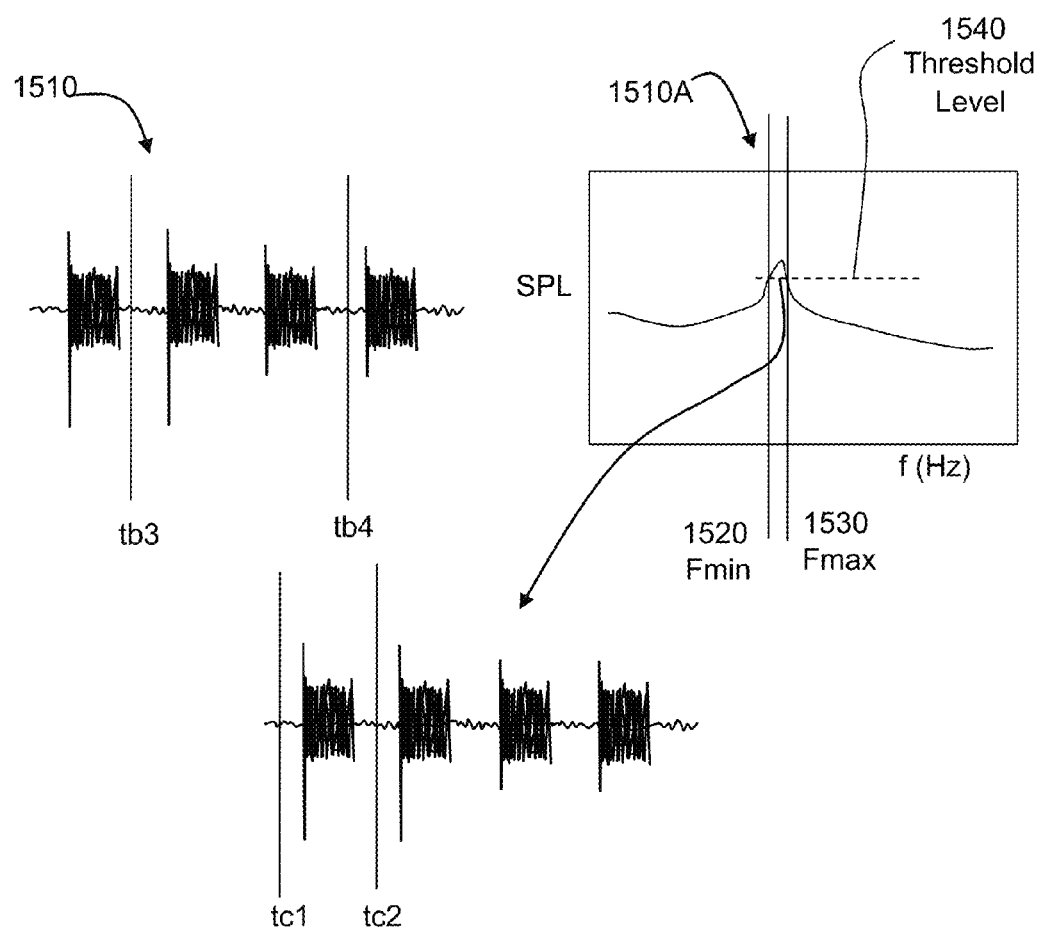

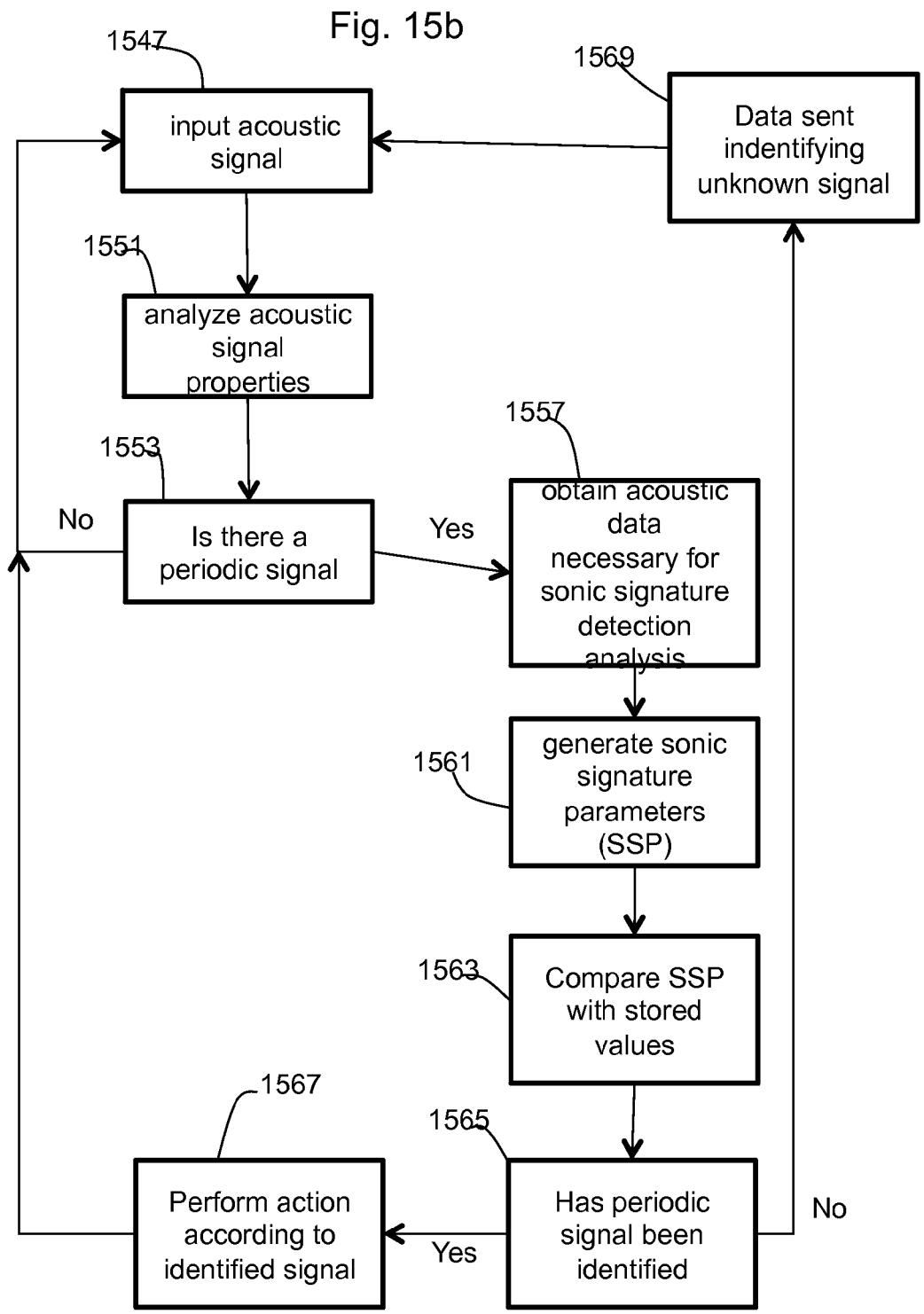

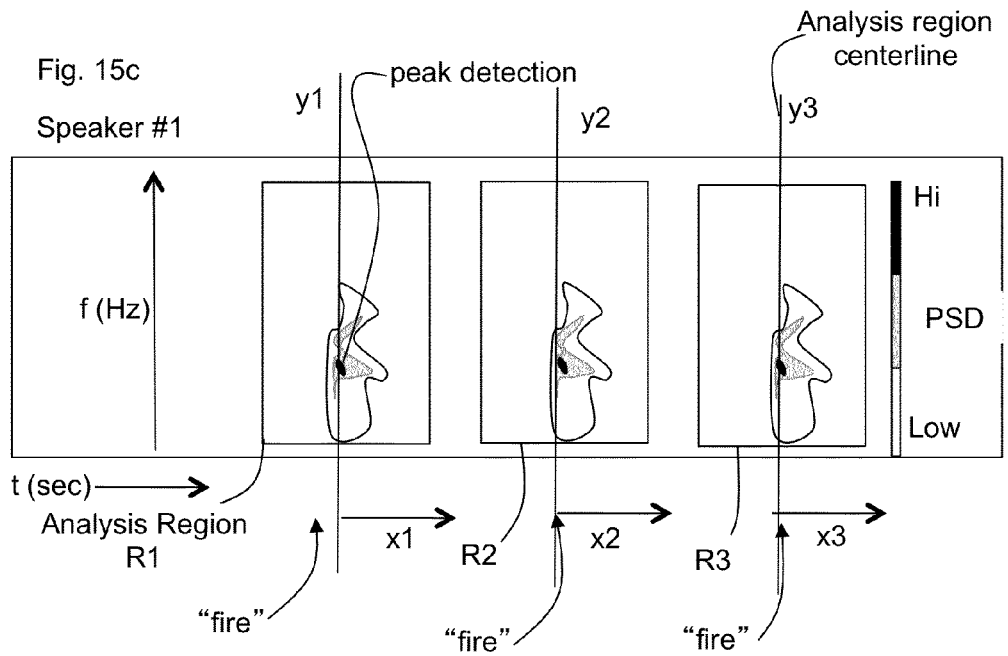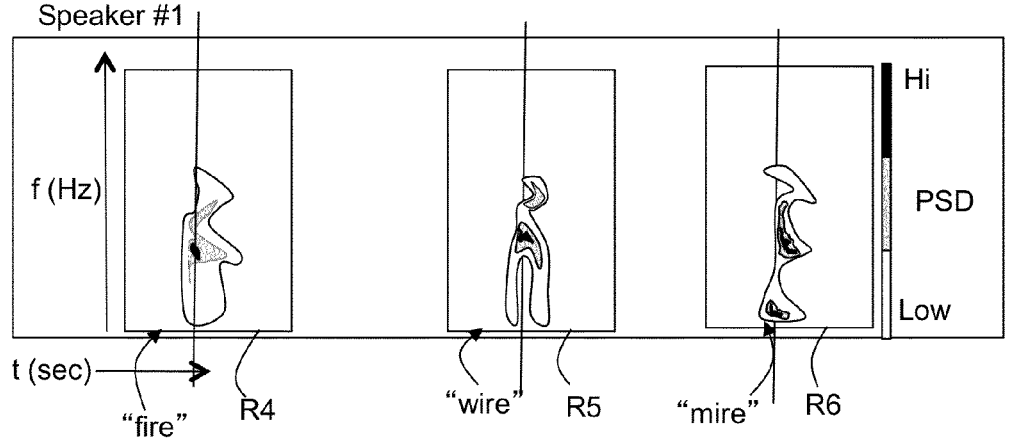

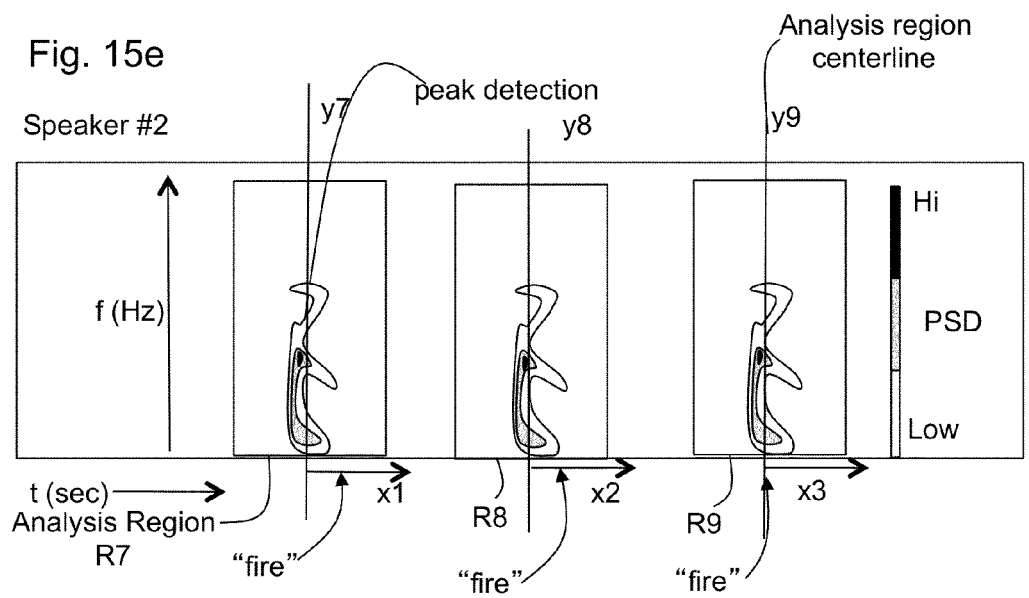
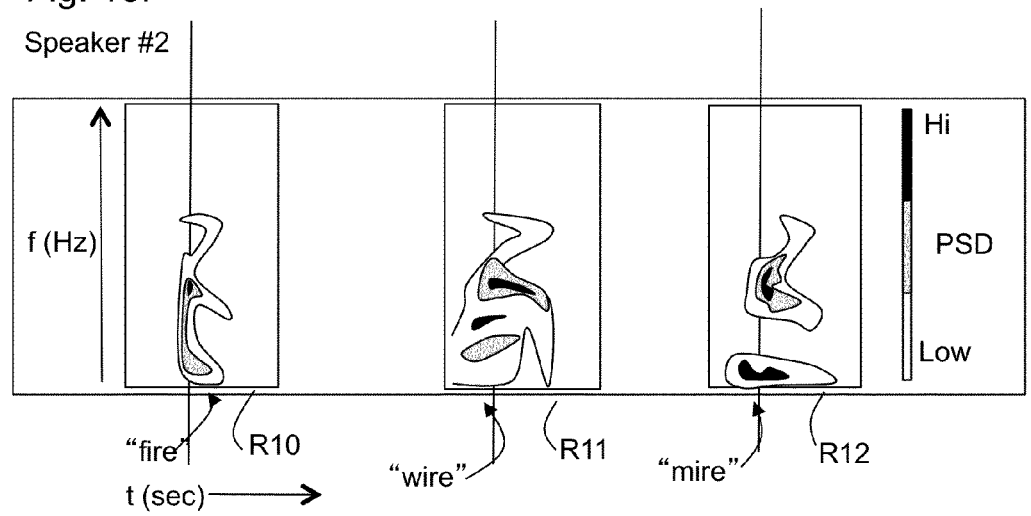

Frequency sweep alarm

Car Horn

Fire Alarm

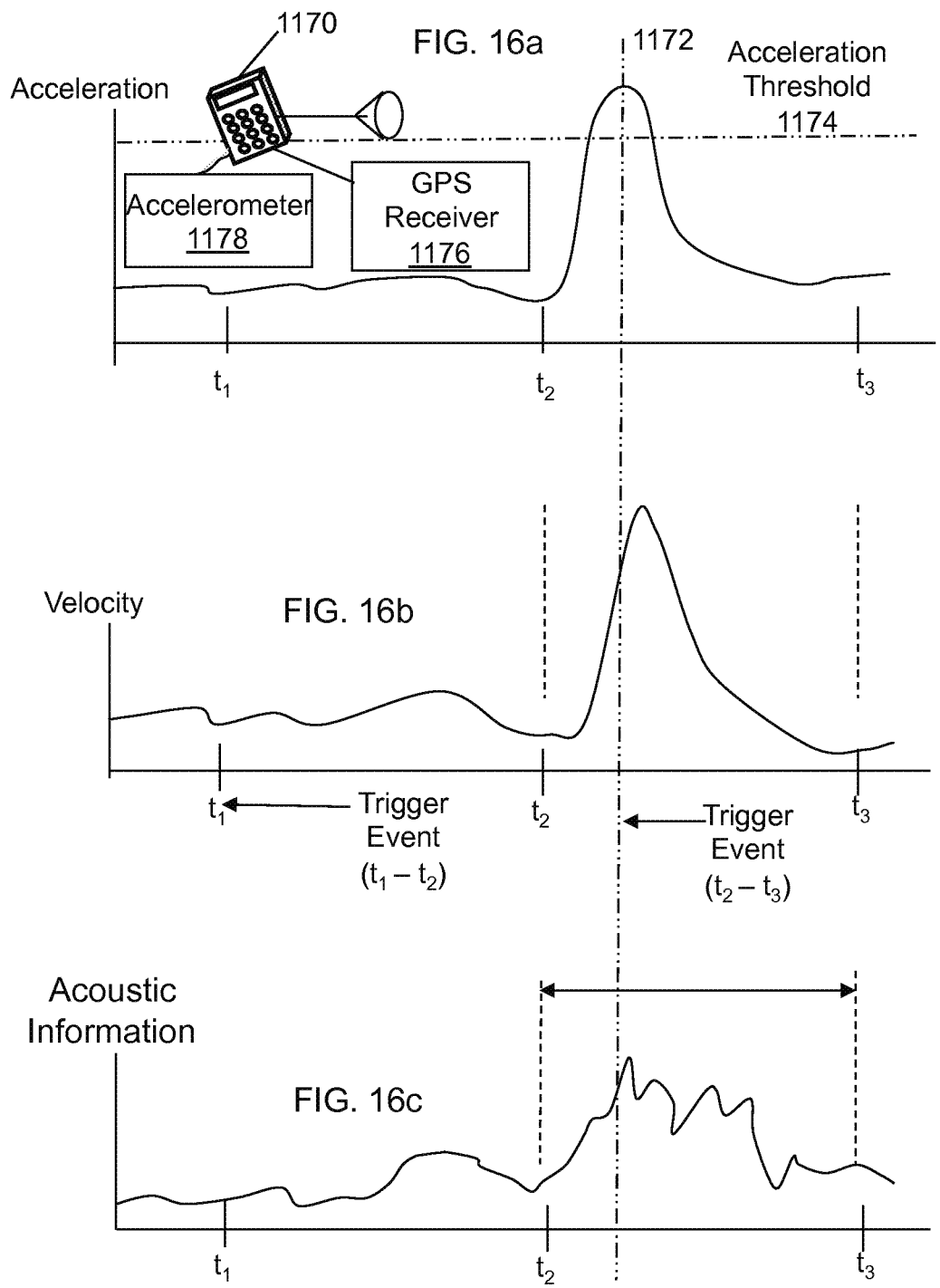

SOUND LIBRARY AND METHOD

CROSS-REFERENCE TO RELATED APPLICATIONS

This application is a continuation of U.S. application Ser. No. 12/560,074 filed on Sep. 15, 2009 which further claims the benefit of U.S. provisional patent application No. 61/097,396 filed 16 Sep. 2008. The disclosure of the aforesaid applications are incorporated herein by reference in their entireties.

FIELD

The invention relates in general to sounds and methods of collecting sounds, and particularly though not exclusively, is related to creating a library of sounds.

BACKGROUND

Acoustic sounds in the environment evolve with the progress of civilization and technology. Over time, people have adapted to the acoustic changes and learned to recognize sounds brought on by new technologies. The sounds of a large city differ as the mode of transportation changes from walking to bicycles, cars, subways, and airplanes since each mode of transportation imparts its own unique acoustic sound. Sounds are a reflection of location, environment, and culture. For instance, the sound of the wind howling in an undisturbed canyon in Australia or the sounds of traffic or a restaurant in Times Square in New York on New Years Eve are an unique acoustic snapshot of a time, place and event.

With all the information available today, there is not a single searchable database of naturally occurring and man-made sounds that is available to the world. The acoustic information that has been saved is in many types of media formats and stored in many locations making it difficult to find and use. Moreover, the number of people preserving sounds is relatively small in relation to the acoustic information being created on a daily basis. It is likely that with the rate of change occurring around us that sounds that were widely prevalent will no longer be heard again. Preserving and making available acoustic information of all types would be of substantial benefit to mankind.

SUMMARY

At least one exemplary embodiment is directed to a method of collecting acoustic information comprising the steps of: configuring a device to automatically receive, collect, and send acoustic information; analyzing a first set of acoustic information to determine whether a trigger event has occurred; collecting a second set of acoustic information when the trigger event has occurred; and providing the second set of acoustic information to a database.

At least one exemplary embodiment is directed to a method of providing acoustic information with a map comprising the steps of: searching a topic; providing a map associated with the topic; searching an acoustic database for acoustic information related to the topic; and providing the acoustic information related to the topic for playback with the map.

BRIEF DESCRIPTION OF THE DRAWINGS

Exemplary embodiments of present invention will become more fully understood from the detailed description and the accompanying drawings, wherein:

FIG. 15a illustrates triggering using an SPL value in a frequency band;

FIG. 15b illustrates a flow chart describing a triggering event using periodic signals;

FIGS. 15c-15k illustrates various spectrogram signatures that illustrates the use of spectrograms for periodic detection in accordance with at least one exemplary embodiment;

FIGS. 16a-16c illustrate a diagram of the use of sensor data as a trigger event configured to collect acoustic information in accordance with at least one exemplary embodiment;

DETAILED DESCRIPTION OF EXEMPLARY EMBODIMENTS

Figure 1:
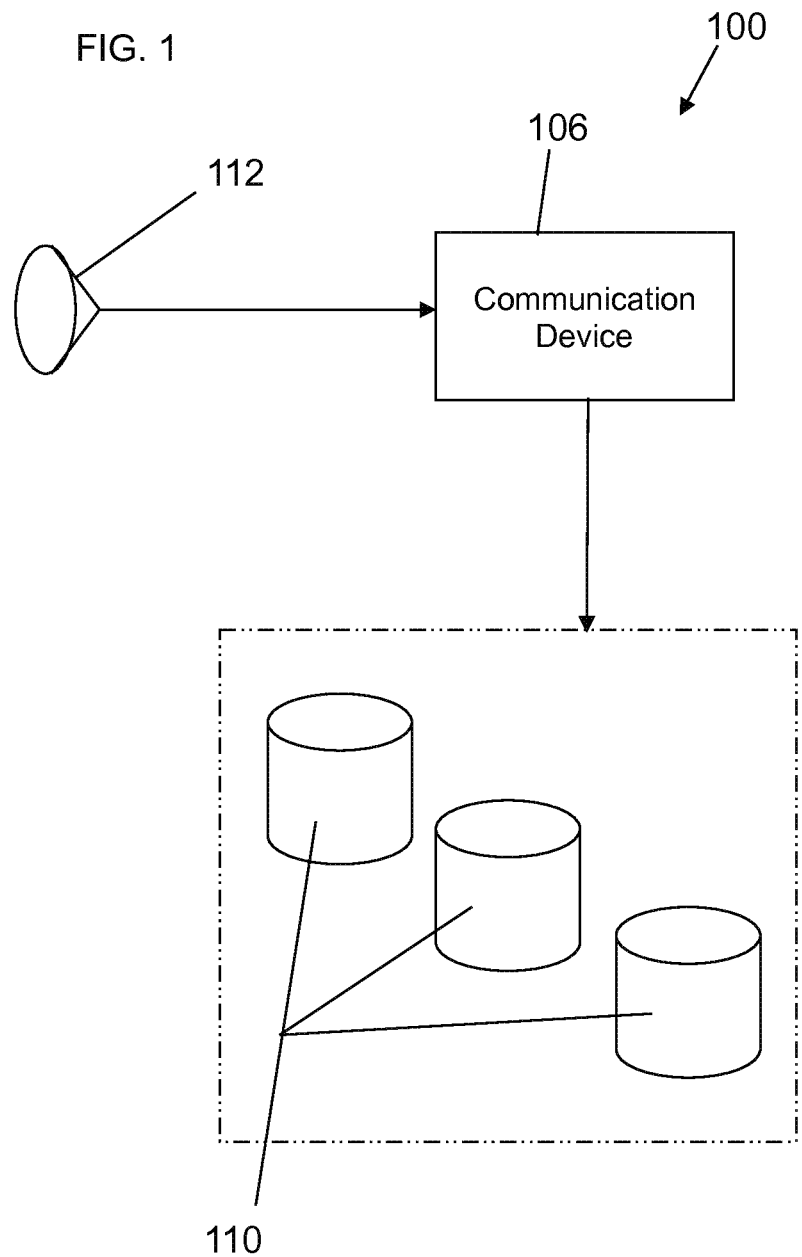
FIG. 1 illustrates a diagram of a website as repository of acoustic information in accordance with at least one exemplary embodiment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally, the sizes of structures used in exemplary embodiments are not limited by any discussion herein (e.g., the sizes of structures can be macro (centimeter, meter, and size), micro (micro meter), nanometer size and smaller).

Notice that similar reference numerals and letters refer to similar items in the following figures, and thus once an item is defined in one figure, it may not be discussed or further defined in the following figures.

In all of the examples illustrated and discussed herein, any specific values, should be interpreted to be illustrative only and non-limiting. Thus, other examples of the exemplary embodiments could have different values.

Although a method of sonic signature detection and identification is provided herein, the scope herein should not be interpreted to be limited to the sonic signature description discussed. For example patent application Ser. No. 12/035,873, filed Feb. 22, 2008, titled "Method and Device for Sound Detection and Audio Control", and Ser. No. 11/966,457, filed Dec. 28, 2007, titled "Method and Device Configured for Sound Signature Detection", both of which are incorporated herein in their entirety, describe additional methods of sonic signature detection.

FIG. 1 is a diagram illustrating a system for capturing acoustic information and storing the acoustic information in a repository in accordance with at least one exemplary embodiment. The system 100 can capture acoustic information around the world using one or more communication devices 106 (e.g., mobile and stationary communication system (e.g., phones, computers)) communicatively coupled to one or more microphones 112 (e.g., Knowles FG microphones, balanced armature, diaphragm, and other acoustic recording and/or measuring devices), analyzing the acoustic information, determining what acoustic information is relevant, providing relevant acoustic information to a database 110 (e.g., commercially available relational databases), organizing the acoustic information, and providing the acoustic information for different applications. Note at least one non-limiting example of the step of "determining what acoustic information is relevant" can include determining whether the acoustic signal is above the noise floor or whether the acoustic signal falls within a topic selected (e.g., car horn, alarm) for example using sonic signature models to identify whether the acoustic signal is the selected topic.

The system 100 leverages the World Wide Web, cellular networks, mesh networks, and other networks used for communication as a path to gain access to a large number of people with socio-economic and geographically diversity. By way of the system 100, people can collect sounds from their unique environment. This permits the efficient capture of various permutations of specific acoustic sounds in the environment at various locations and at different times. Otherwise, it would be an overwhelming effort for one entity, group of people or large organization to collect and manage such an enormous amount of acoustic data.

The system 100 permits manual or automatic recording and entering of sounds into a database 110 for adding to the collection of captured sounds. People can selectively capture sound at a particular time and location, and tag the sound to associate it with a particular experience. Collectively the captured sounds can represent an ensemble sound experience or 'acoustic snapshot' at a particular location. In such regard, the system 100 permits a large segment of the population to collect sounds 24 hours a day.

Communication devices 106 include a microphone configured to receive sound. Typically, people are mobile and carry their communication device with them. Collecting sounds using communication devices 106 will generate a tremendous amount of acoustic information as each person moves from place to place during all times of the day and night. Communication devices 106 can also be adapted to automatically collect and send sounds to database 110 without user intervention and on a continuous basis thereby creating database 110 of acoustic information world wide 24 hours a day. Thus, hundreds of millions or billions of people could be collecting acoustic information for historical, social, scientific, medical, and business purposes.

In at least one exemplary embodiment, the collection of sounds is implied in its broadest context to frequencies above and below human hearing range and to the types of sounds being collected. The cry of a baby, a person snoring, the sound of a snake slithering on the ground, the noise of a city street, or rain in the desert, are just a few examples of sounds that can be recorded and stored and placed in context to a location and a point in time.

In at least one exemplary embodiment, a catalog of distinct sounds can be generated. Collected sounds will be organized to build an original set of sounds representative of the distinct audible elements of our lives. These sounds will be cataloged and cross-referenced so as to be indexable (e.g., vehicles, type of car, boat, ocean, beach, baby cry) and searchable on a number of levels. An example of a few categories for illustration purposes are residential sounds broken into sounds of the home, sounds of the garage, sounds from the lawn and without those categories classifications for appliances, tools and machines that are traditionally found there. Additional categories could be commercial (e.g. factories, call centers, construction Sites, offices, hotels, etc.), medical (e.g. dental offices, surgery rooms, hospitals, etc.), transportation (e.g. airplanes, buses, trains, subways, vehicles, etc.) to name but a few. In cataloging these sounds, it is also intended that as much metadata as possible is captured and associated with the sound. There is also the aspect of collected sounds for use in socialization, which will be discussed further hereinbelow.

A further use can be military in nature. A littoral environment can be real time acoustically mapped, tagged and sent via a secure communication network. The tagged acoustic signals can be displayed on a map and electronically and/or manually analyzed to identify enemy activity, location trends, ammunition usage, vehicle location and movements, friendly location and movement, as well as other intelligence useful for the military planner.

Figure 2:
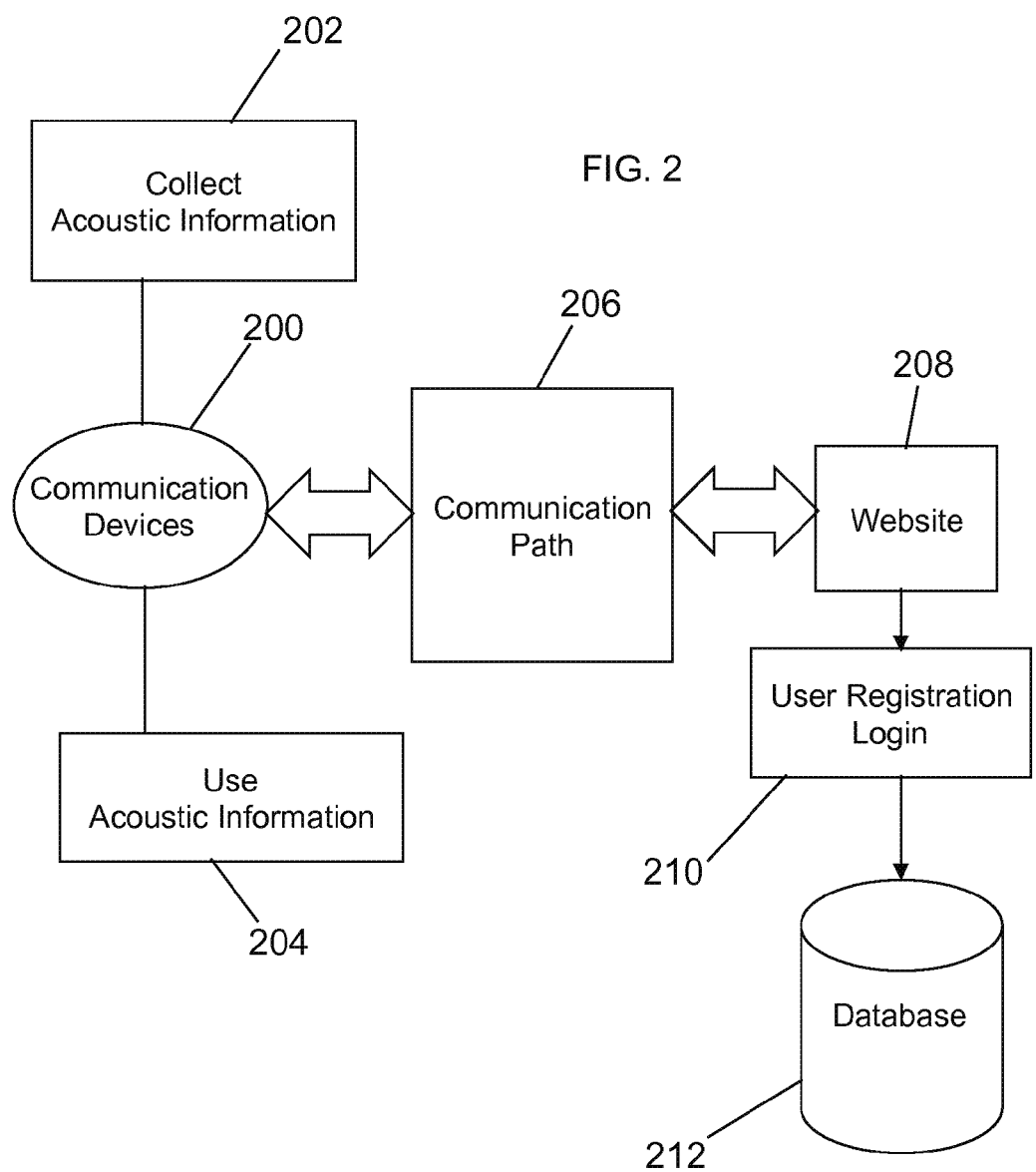
FIG. 2 illustrates a diagram of a website and a user community for managing and using a database in accordance with at least one exemplary embodiment.

FIG. 2 is a diagram illustrating a website 208 and a user community for managing and using a database 212 in accordance with at least one exemplary embodiment. Communication devices 200 automatically collect acoustic information 202 and upload the acoustic information through a communication path 206 to a database 212. A communication path 206 can be the internet, wired or wireless networks, satellite, that can couple to database 212. Website 208 leverages a global member community to help catalog, provide information, and maintain the integrity of acoustic information in the website. In at least one exemplary embodiment, communication devices can also download acoustic information from database 212 through communication path 206 for use on communication devices 200.

Website 208 allows participants to collaborate with others in capturing, identifying, cataloging, and formatting the acoustic information received automatically through communication devices as well as manually provided acoustic information. Global users 200 will be able to add, use, edit, delete, and modify the sound content within certain limits in website 208.

The web pages of website 208 engage everyone to participate in a database 212 of acoustic information. Through an open web community, tens of thousands or millions of participants can join into the project. Thus, a database of sounds from around the world can be assembled in an efficient manner and accessible to everyone for present and future generations. In at least one exemplary embodiment, users will have to register once and login as indicated by block 210 to use the website. Once logged in, users will have access to the database within certain privileges In at least one exemplary embodiment, user access to database 212 can be based on his/her personal contributions or by paying for access.

The website 208 can format, catalog, and organize the sounds in accordance with a common set of technology and organizational guidelines. It can regulate and manage the collection and cataloging of sounds via collaborative tools available in the community thereby permitting users to regulate the collection process and instill aspects of quality control.

One aspect of website 208 is to catalog a diversity of sounds into a common database. Each sound entered into database 212 is identified and categorized so that it can be referenced and cross referenced on a multitude of different levels through their associated metadata. In at least one exemplary embodiment, sound signatures are stored in database 212. Sound signatures can also be stored as sound models. For example each collection of a unique sound (e.g., horn, siren, bell, whistle, etc.) can be represented as a Gaussian Mixture Model (GMM). The parameters of the GMM fully describe the sound in a pattern recognition sense. The GMM can then be used to recognize new occurrences of that unique sound, for example, a newly recorded horn sound. Having the GMM of a sound reduces the need for storing the entire acoustic sound waveform in memory thereby reducing memory requirements when storing such a vast amount of information. The GMM can be used in searching, identifying, and comparing sounds in database 212. In at least one exemplary embodiment, there will be at least one GMM for each sound (e.g. horn, whistle, snoring, etc.) stored in database 212.

Figure 3:
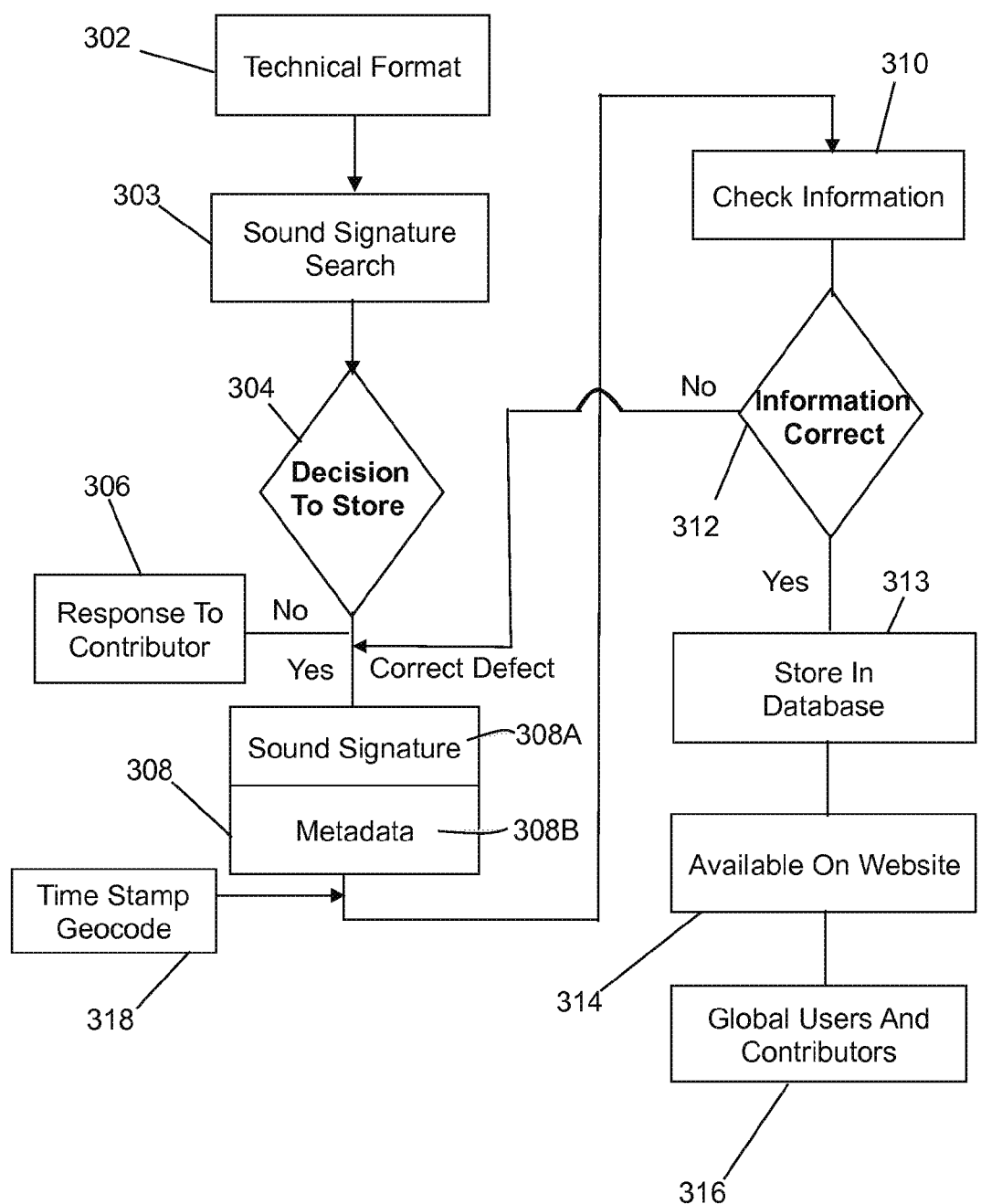
FIG. 3 illustrates a diagram of a user providing a sound signature to the database of the website in accordance with at least one exemplary embodiment.

FIG. 3 is a diagram illustrating a process for providing a sound signature to the database of the website in accordance with at least one exemplary embodiment. Sound signatures provided to the website are reviewed before incorporation into the database. In at least one exemplary embodiment, the technical format 302 of the sound signature is checked to ensure it meets the standards for incorporation. Meeting minimum technical standards and limiting the number of formats will allow the community to have access to quality recordings. In at least one exemplary embodiment, technical format 302 can include programs that can convert non-compliant audio formats to a compliant format for the website.

In at least one exemplary embodiment, the sound signature being provided is compared against others in the database in sound signature search 304. The contributor or automatically generated metadata provides search parameters associated with the sound signature that aids in the comparison. In at least one exemplary embodiment, sound signatures for various sound categories can be represented by a Gaussian mixture model (GMM). A GMM would also be generated if only acoustic information was provided. Each GMM provides a model for the distribution of the feature statistics for each sound signature in a multi-dimensional space. The GMM can be used in the search or identification of an unknown sound. The sound signature can also be compared for its uniqueness and technical qualities against other sound signatures that reside in the database. Furthermore, the community of contributors to the website can play a significant role in the decision process of the merits of the sound signature once it has been placed in the website.

A response 306 is provided to the contributor if the decision is not to include the sound signature in the database. Response 306 can indicate the various reasons why the sound signature is not used such as a similar signature already exists, technical issues, or other factors not to include. A yes decision to incorporate the sound signature includes providing metadata. In general, the metadata can information relevant and related to the sound signature. In at least one exemplary embodiment, the metadata aids in searching, categorizing, and providing information on the sound (to help identify the sound signature or cross reference the sound signature with other sound signatures in the database. Descriptions or data about the sound signature such as what, when, and where are part of the metadata provided. The metadata can grow to a high level of sophistication as the database grows and the needs of the users and contributors are better understood.

As mentioned previously, a database or archive is being created of sounds around the world. Knowledge of when the sound was recorded and where it was recorded is stored in the database along with the sound signature. Thus, a component of the metadata can time stamp and geocode 318. The time stamp is the time at which the sound signature was taken. This information can be taken and provided manually or provided automatically as part of the recording process. The geocode is a coordinate measurement that provides a representation of the exact point or location where the measurement is taken whether it is on the planet earth or somewhere in the universe. In at least one exemplary embodiment, the device taking the sound measurement has GPS or the geocode is provided using a separate global positioning system (GPS) device for providing the position where the sound signature was taken. Alternatively additional location methods can be used, for example cell tower triangulation of signals sent. In at least one exemplary embodiment, the recording device would be designed to provide time stamp and geocode 318 automatically with the sound signature. A three dimensional acoustic map of the world can be generated including the changes that occur over time with this database.

One example of metadata is information that juxtaposes sounds from similar categories against others in those categories but with different geographic origination. Common devices but in different geographic locations will have different sounds. Emergency or police sirens have the same meaning (e.g. emergency vehicle or police are near and may be approaching rapidly) but may sound radically different depending on the country of origin. This type of difference extends to a large number of objects such as vacuum cleaners, door bells, horns, etc. depending on the country or continent (US, Europe, Asia, etc. . . . ). The metadata associated with each sound signature will catalog all of the different sounds into a common database, and then organize the sounds so that they can be referenced and cross referenced on a multitude of different levels through their associated metadata.

In at least one exemplary embodiment, the website provides a form to be filled out to provide the appropriate metadata, this form can also be incorporated in a communication device and be automatically attached to sound signatures captured and being provided to the database. Sound signature and metadata 308 is reviewed in a check information 310 step. The contributor or owner of the communication device can be notified to correct any errors found during check information 310. The sound signature and metadata are stored in a step 312 into the database. Once stored in the database global users and contributors 316 can review the sound signature and metadata 308 on website 314.

Figure 4:
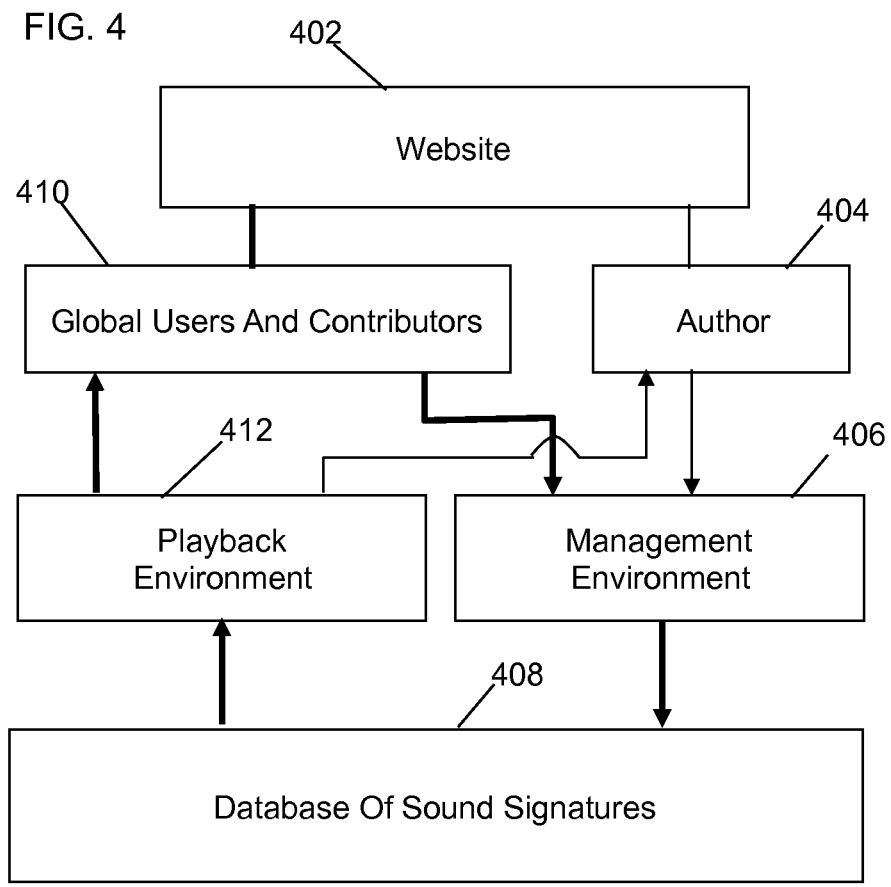
FIG. 4 illustrates a diagram of using of a playback and management environment in accordance with at least one exemplary embodiment.

FIG. 4 is a diagram illustrating use of a playback and management environment in accordance with at least one exemplary embodiment. A website 402 uses collaborative editing of the content and structure. A lasting community is built and formed using this collaborative approach to the website. In at least one exemplary embodiment, an online community helps catalogue, add information, add features, and maintain the website.

As mentioned hereinabove, the sounds are be tagged with associated metadata that will describe what the sound is. An example of a captured sound and the metadata associated therewith is a 2004 Lincoln Towncar honking horn on the corner of $48^{th}$ and $6^{th}$ Avenue in NYC near the Rockefeller Center at 2 pm on Monday, Jun. 16, 2008. The owner of the communication device may also provide descriptions to the metadata of the sound signature that exists in relation to the primary sound such as other vehicles in transit, pedestrian traffic, and policeman's whistle. Conversely, a comparison of sound signatures in database 408 may yield a good match and the associated metadata of the match such as horn, car, street, etc. could be attached to the new provided sound signature.

Website 402 environment is a tool to research, upload, catalog, listen to and maintain a database of acoustic information. An author 404 or global users and contributors 410 can utilize a management environment 406 that allows author 404 or global users and contributors 410 to manage aspects of the sound signatures. In at least one exemplary embodiment, author 404 or global users and contributors 410 use management environment 406 to modify or remove an existing sound signature, add new sound signatures, and add to or modify associated metadata stored within database of sound signatures 408. The addition of new tools that support all aspects of sound signature capture and use can be incorporated into website 402. Similarly, new information about a sound signature or how the sound signature can be used can be added by author 404 or global users and contributors 410. Needs driven by the utility of having a large database of sound signatures will encourage the community to contribute to increase the functionality of the website, grow the size of the database, add new features, and add new information.

Website 402 includes a playback environment 412. Playback environment 412 allows for sounds to be played back through the website using common audio protocols. Playback environment 412 accesses database of sound signatures 408 prompted by a user for playing back a selected sound signature.

Figure 5:
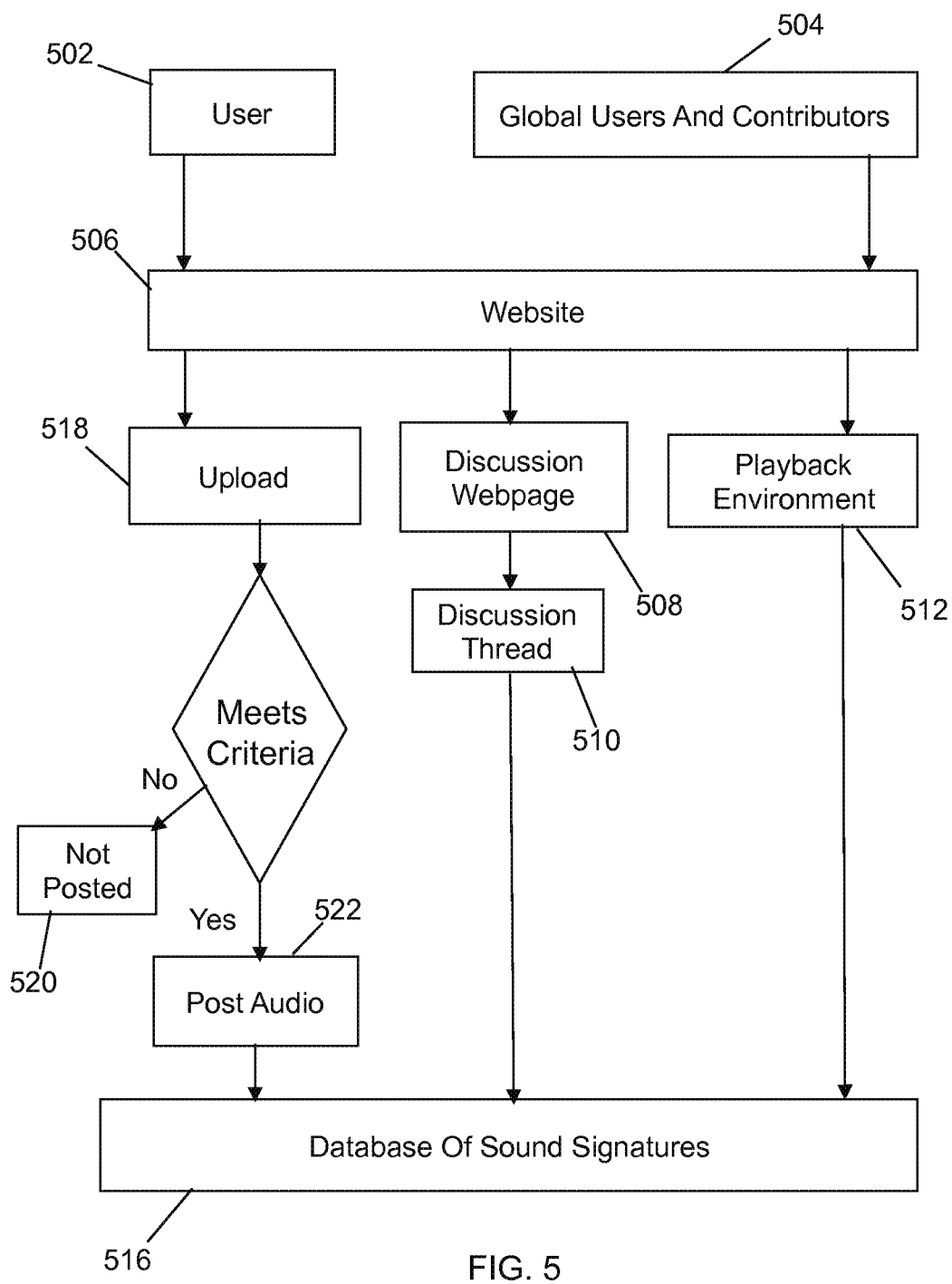
FIG. 5 illustrates a diagram of a discussion webpage in accordance with at least one exemplary embodiment.

FIG. 5 is a diagram illustrating a discussion webpage in accordance with at least one exemplary embodiment. A website 506 includes database of sound signatures 516. In general, users of website 506 may record acoustic information that they believe is interesting and merits discussion among the community of users. Website 506 includes a discussion webpage 508 for posting acoustic information or sound signatures of interest.

An author 502 or user with acoustic information accesses website 506. Author 502 wants to post the acoustic information in the discussion webpage 508. The acoustic information is uploaded in a step 518 to website 506. The acoustic information is checked for both technical and content merits. The acoustic information is rejected and not posted if the criteria are not met. In at least one exemplary embodiment, author 502 may be notified about the reasons for rejection allowing correction of the faults. Although, acoustic information is discussed hereinabove, the meaning of acoustic information does not merely imply only sound. In general, the data or information provided by users will include acoustic information but may include any other material. An example of additional information along with the acoustic information is video information.

The acoustic information provided by author 502 is accepted if website 506 criteria are met. The acoustic information is stored in database 516 and is provided on the website in a post audio step 522. In at least one exemplary embodiment, discussion webpage 508 includes a discussion thread 510 corresponding to the posted acoustic information that may be started by author 502 or perhaps someone else within the community. Global users and contributors 504, seeing discussion thread 510 can playback the posted acoustic information using playback environment 512. Global users and contributors 504 can respond and discuss the posted acoustic information to begin or continue a conversation on a specific theme. For example, a user could post a recorded sound and sound pressure level of a busy street. The discussion could take the form of what is the loudest city in the world. Another example of a thread could be the impact of continuous noise on the health of a human being.

Figure 6:
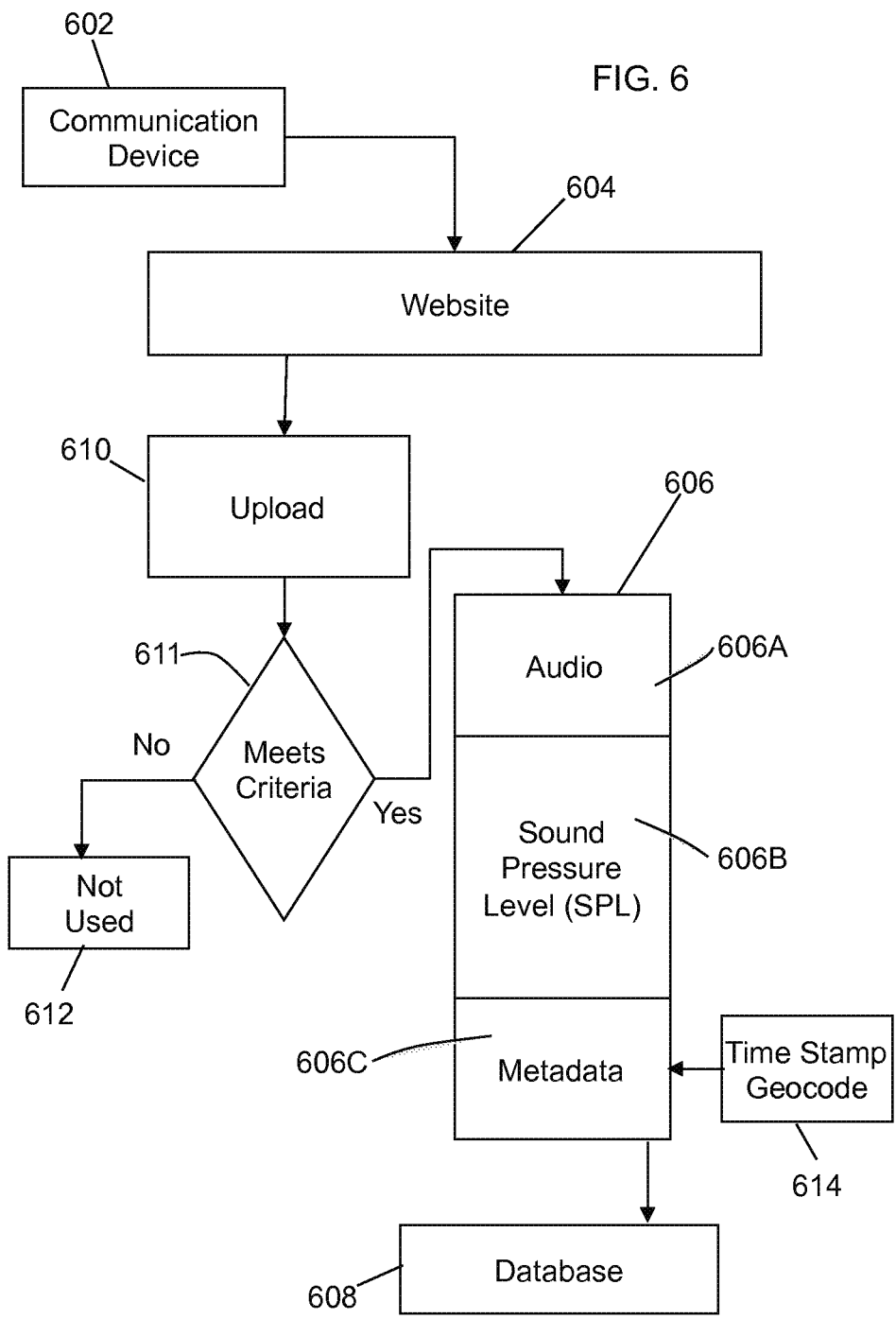
FIG. 6 illustrates a diagram of a database of sound pressure levels in accordance with at least one exemplary embodiment.

FIG. 6 is a diagram illustrating a database of sound pressure levels in accordance with at least one exemplary embodiment. As mentioned previously, the world is ever changing; the sound and sound levels change over time. There is no single database or catalog of different sounds found throughout the world. Furthermore, there is very little information available about sound pressure levels. Sound pressure levels have changed drastically over time due to climatic, geographic, environmental, and natural conditions.

Communication device 602 automatically uploads acoustic information or sound signatures that include sound pressure level (SPL) measurements. In general, communication device 602 is adapted for measuring SPLs. The acoustic information is checked as discussed hereinabove. The acoustic information is not used if it does not meet established criteria. The sound signature is prepared for storing in database 608 by including information about the sound pressure level with the sound signature. Metadata including time stamp and geocode 614 is used to categorize and catalogue the sound signature and sound pressure level measurement. Furthermore, the metadata aids in a searching and providing information on the sound signature and sound pressure level measurement. The sound signature, sound pressure level, and metadata are then stored in database 608. The user community of website 604 then has access to the information.

The sound pressure level measurement is typically a measure of sound relative to a reference value. For example, the threshold of human hearing is a common reference value. Sounds pressure levels measured above the threshold of human hearing would be audible to an average human being. Having a database of measured sound pressure levels around the planet or the universe that is continuously updated would have substantial utility to the scientific, medical, government, businesses, and the individual. In at least one exemplary embodiment the quality of the sound pressure level measurement or any acoustic recording would be checked for quality control. For example if a microphone type is identified that did the recording, then a microphone database can referenced to determine a microphone response function. The microphone response function can be used to check whether the recorded signal exceeds operational range of the microphone. Additionally if calibration information is available for the recording microphone, the calibration information can be used to adjust any recording.

One example is disclosed in published reports on the long term exposure of sound to human health. It is well known that loud sounds can damage the ear. Long term exposure to even moderate sound pressure levels can damage the ear or produce hearing or frequency loss. Moreover, the sound content can also play a role in a person's health. People have different coping mechanisms for dealing with sounds. Too much sound or too much diversity of sound can be difficult for the brain to process. Physical effects such as depression, sleeplessness, or other ailments can result of sound exposure. Having a database of sound pressure levels, time, date, and geographical location would have substantial utility to mankind. For example, trends in sound pressure levels over time correlated with health related issues in a geographic area where the ambient sound is of a high level could show the impact of sound to behavior and health. In another example, the sound pressure level pertaining to a restaurant could have utility by a user wanting to know if a restaurant is noisy or is the atmosphere conducive to a romantic date. In a further example, noise patterns within a city could be used as a factor in the location of a corporate headquarters and in the construction specifications related to sound insulation.

Figure 7:
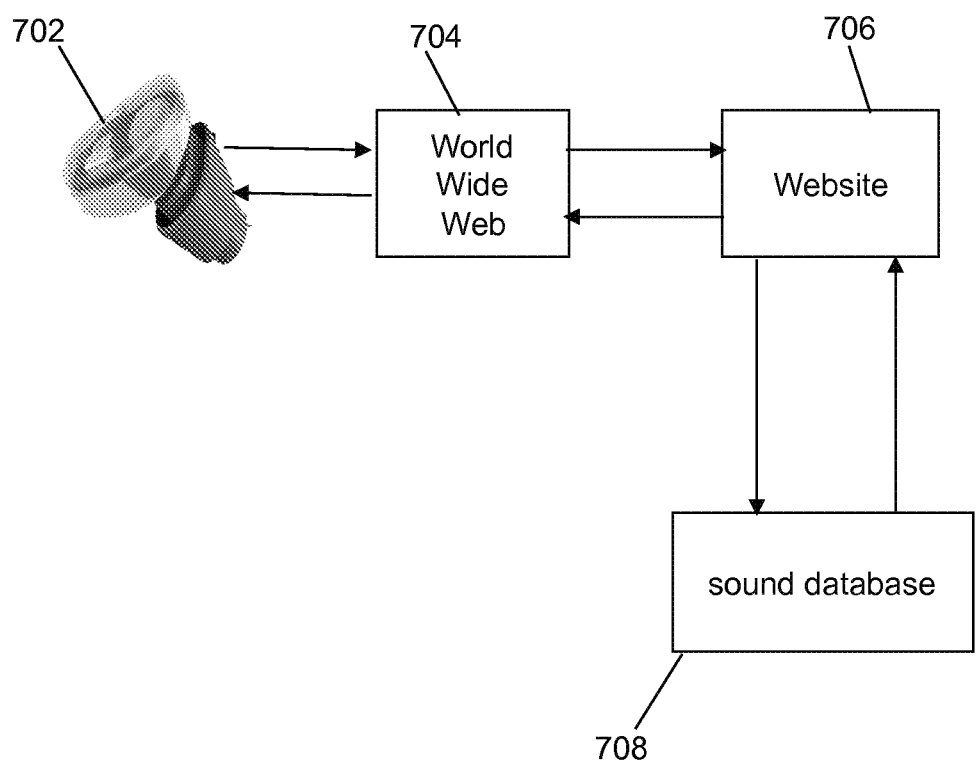
FIG. 7 illustrates a diagram of an earpiece receiving a sound signature from the website in accordance with at least one exemplary embodiment.

FIG. 7 is a diagram of an earpiece system receiving a sound signature from the website 706. The earpiece itself can seal or partially seal an ear. It should be noted that the earpiece system can take many shapes and sizes. Earpiece or headset configurations such as circum-aural, supra-aural, behind the ear, concha, in-ear, are designs that seal or partially seal the ear. Earpiece 702 includes at least one microphone and one speaker. In at least one exemplary embodiment disclosed hereinbelow, earpiece 702 includes an ambient sound microphone, an ear canal microphone, and an ear canal receiver for respectively receiving ambient sound, receiving sound in an ear canal of a user, and providing sound to the ear canal of the user.

Earpiece 702 is coupled to the website 706 via the World Wide Web 704 or other wired or wireless connection to receive a sound signature from sound database 708. Earpiece 702 can be connected to website 706 through a wired or wireless connection. Earpiece 702 can have an interface that directly connects to World Wide Web 704 or can use a medium such as a personal computer or cell phone that is connected to the internet. For example, earpiece 702 can connect through a USB cable to the personal computer to download one or more sound signatures. The display of the personal computer would be used to navigate website 706. Similarly, earpiece 702 can connect to a cell phone or laptop through a wireless connection such as Bluetooth, Zigbee, Wimax, or UWB. One or more sound signatures are found through searching sound database 708 using the web environment provided by website 706. The sound signatures are then stored in memory in earpiece 702 for use in a variety of applications which will be discussed further hereinbelow.

Figure 8:
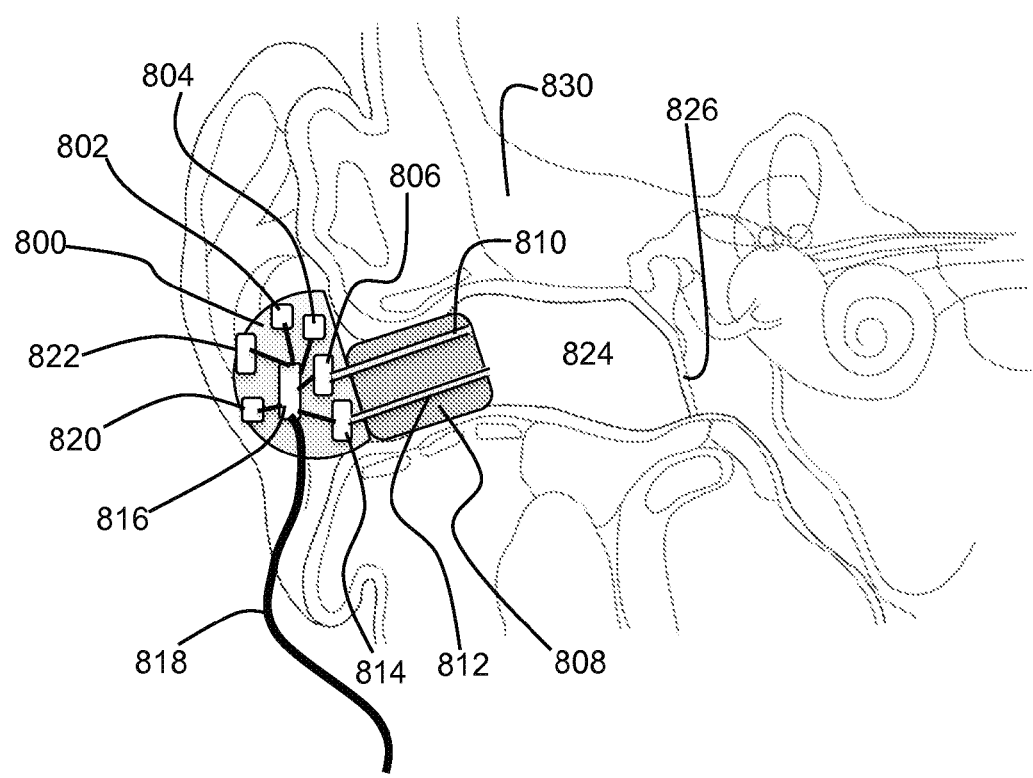
FIG. 8 illustrates a diagram of an earpiece partially sealing or sealing an ear of a user in accordance with at least one exemplary embodiment.

FIG. 8 is an illustration of an earpiece device, generally indicated as earpiece that partially seals or seals a user's ear canal 824 and is constructed and operates in accordance with at least one exemplary embodiment of the invention. As illustrated, the earpiece comprises an electronic housing unit 800 and a sealing unit 808. The earpiece depicts an electroacoustical assembly for an in-the-ear acoustic assembly, as it would typically be placed in an ear canal 824 of a user 830. The earpiece can be an in the ear earpiece, behind the ear earpiece, receiver in the ear, partial-fit device, or any other suitable earpiece type. The earpiece can partially or fully occlude ear canal 824, and can be configured for use with users having healthy or abnormal auditory functioning.

The earpiece includes an Ambient Sound Microphone (ASM) 820 to capture ambient sound, an Ear Canal Receiver (ECR) 814 to deliver audio to an ear canal 824, and an Ear Canal Microphone (ECM) 806 to capture and assess a sound exposure level within the ear canal 824. The earpiece can partially or fully occlude the ear canal 824 to provide various degrees of acoustic isolation. In at least one exemplary embodiment, assembly is designed to be inserted into the user's ear canal 824, and to form an acoustic seal with the walls of the ear canal 824 at a location between the entrance to the ear canal 824 and the tympanic membrane (or ear drum). In general, such a seal is typically achieved by means of a soft and compliant housing of sealing unit 808.

Sealing unit 808 is an acoustic barrier having a first side corresponding to ear canal 824 and a second side corresponding to the ambient environment. In at least one exemplary embodiment, sealing unit 808 includes an ear canal microphone tube 810 and an ear canal receiver tube 814. Sealing unit 808 creates a closed cavity of approximately 5 cc between the first side of sealing unit 808 and the tympanic membrane in ear canal 824. As a result of this sealing, the ECR (speaker) 814 is able to generate a full range bass response when reproducing sounds for the user. This seal also serves to significantly reduce the sound pressure level at the user's eardrum resulting from the sound field at the entrance to the ear canal 824. This seal is also a basis for a sound isolating performance of the electro-acoustic assembly.

In at least one exemplary embodiment and in broader context, the second side of sealing unit 808 corresponds to the earpiece, electronic housing unit 800, and ambient sound microphone 820 that is exposed to the ambient environment. Ambient sound microphone 820 receives ambient sound from the ambient environment around the user.

Electronic housing unit 800 houses system components such as a microprocessor 816, memory 804, battery 802, ECM 806, ASM 820, ECR, 814, and user interface 822. Microprocessor 816 (or processor 816) can be a logic circuit, a digital signal processor, controller, or the like for performing calculations and operations for the earpiece. Microprocessor 816 is operatively coupled to memory 804, ECM 806, ASM 820, ECR 814, and user interface 820. A wire 818 provides an external connection to the earpiece. Battery 802 powers the circuits and transducers of the earpiece. Battery 802 can be a rechargeable or replaceable battery.

In at least one exemplary embodiment, electronic housing unit 800 is adjacent to sealing unit 808. Openings in electronic housing unit 800 receive ECM tube 810 and ECR tube 812 to respectively couple to ECM 806 and ECR 814. ECR tube 812 and ECM tube 810 acoustically couple signals to and from ear canal 824. For example, ECR outputs an acoustic signal through ECR tube 812 and into ear canal 824 where it is received by the tympanic membrane of the user of the earpiece. Conversely, ECM 814 receives an acoustic signal present in ear canal 824 though ECM tube 810. All transducers shown can receive or transmit audio signals to a processor 816 that undertakes audio signal processing and provides a transceiver for audio via the wired (wire 818) or a wireless communication path.

The earpiece can actively monitor a sound pressure level both inside and outside an ear canal 824 and enhance spatial and timbral sound quality while maintaining supervision to ensure safe sound reproduction levels. The earpiece in various embodiments can conduct listening tests, filter sounds in the environment, monitor warning sounds in the environment, present notification based on identified warning sounds, maintain constant audio content to ambient sound levels, and filter sound in accordance with a Personalized Hearing Level (PHL).

In at least one exemplary embodiment, the earpiece can download one or more sound signatures through a wired or wireless interconnection to a website. For example, the earpiece is connected through a personal computer or a cell phone to the website. The desired sound signature is downloaded to the earpiece. In general, a sound signature is a sound or sounds that the user wants the earpiece to identify. The earpiece has one or more microphones for hearing sounds. ASM 820 is coupled to the ambient environment of the user. Conversely, ECM 806 is coupled to ear canal 824 and is isolated from the ambient environment by sealing unit 808.

In at least one exemplary embodiment, ASM 820 is providing acoustic information from the ambient environment to processor 816. Processor 816 analyses the acoustic information for a sound similar to the sound signature. Once identified, the earpiece will provide a response to the sound based on the application. For example, the user of the earpiece would like to hear or be aware of ambulances or police cars when wearing the earpiece. Note that similar can be a comparison of FFTs in frequency bands, where the difference between the values of the sound is similar to a particular sonic signature if the standard deviation amongst all frequency bands is below a threshold value (e.g., 3 dB). Additionally a Gaussian mixture model can be used where the confidence level is better than a threshold value (e.g., 80%) that the sound is a particularly detected sonic signature.

The user downloads sound signatures from the website (or a website associated with the database of website) to the earpiece related to ambulances and police car sirens and horns. While the user is using the earpiece, processor 816 of the earpiece analyses acoustic information provided by ASM 820 for sounds similar to the downloaded sound signatures. Upon identifying an ambulance or police car horn or siren in the ambient environment, the earpiece will notify the user that the ambulance or police car is approaching. In a first exemplary embodiment, the earpiece will reduce music or telephone call (or the dominant source of sound being provided by the earpiece) and amplify the identified signal (ambulance or police car) thereby notifying the user of the approaching vehicle. In a second exemplary embodiment, the earpiece will tell the user (through a synthesized voice) that an ambulance or police car is approaching including the direction of the vehicle. The earpiece can also provide the identified signal with the voice warning. Other variations are possible.

Conversely, the earpiece can perform the opposite operation. The earpiece can identify a signal similar to the sound signature and then attenuate it before providing it through ECR 814. For example, the user of the earpiece is a gun enthusiast. The user downloads a sound signature related to a gun shot. The earpiece upon identifying the sound of the gun shot would attenuate the portion of the acoustic information provided by ASM 820 similar to the sound signature of the gun shot while allowing other signals to come through. Thus, the user could engage in a conversation at the gun range with the gun shot sounds attenuated while passing the conversation through the earpiece thereby protecting his ear from the loud sounds in this environment and being able to hear the conversation with more clarity.

The earpiece can generate an Ear Canal Transfer Function (ECTF) to model the ear canal 824 using ECR 814 and ECM 806, as well as an Outer Ear Canal Transfer function (OETF) using ASM 820. For instance, the ECR 814 can deliver an impulse within the ear canal 824 and generate the ECTF via cross correlation of the impulse with the impulse response of the ear canal 824. The earpiece can also determine a sealing profile with the user's ear to compensate for any leakage. It also includes a Sound Pressure Level Dosimeter to estimate sound exposure and recovery times. This permits the earpiece to safely administer and monitor sound exposure to the ear.

Figure 9:
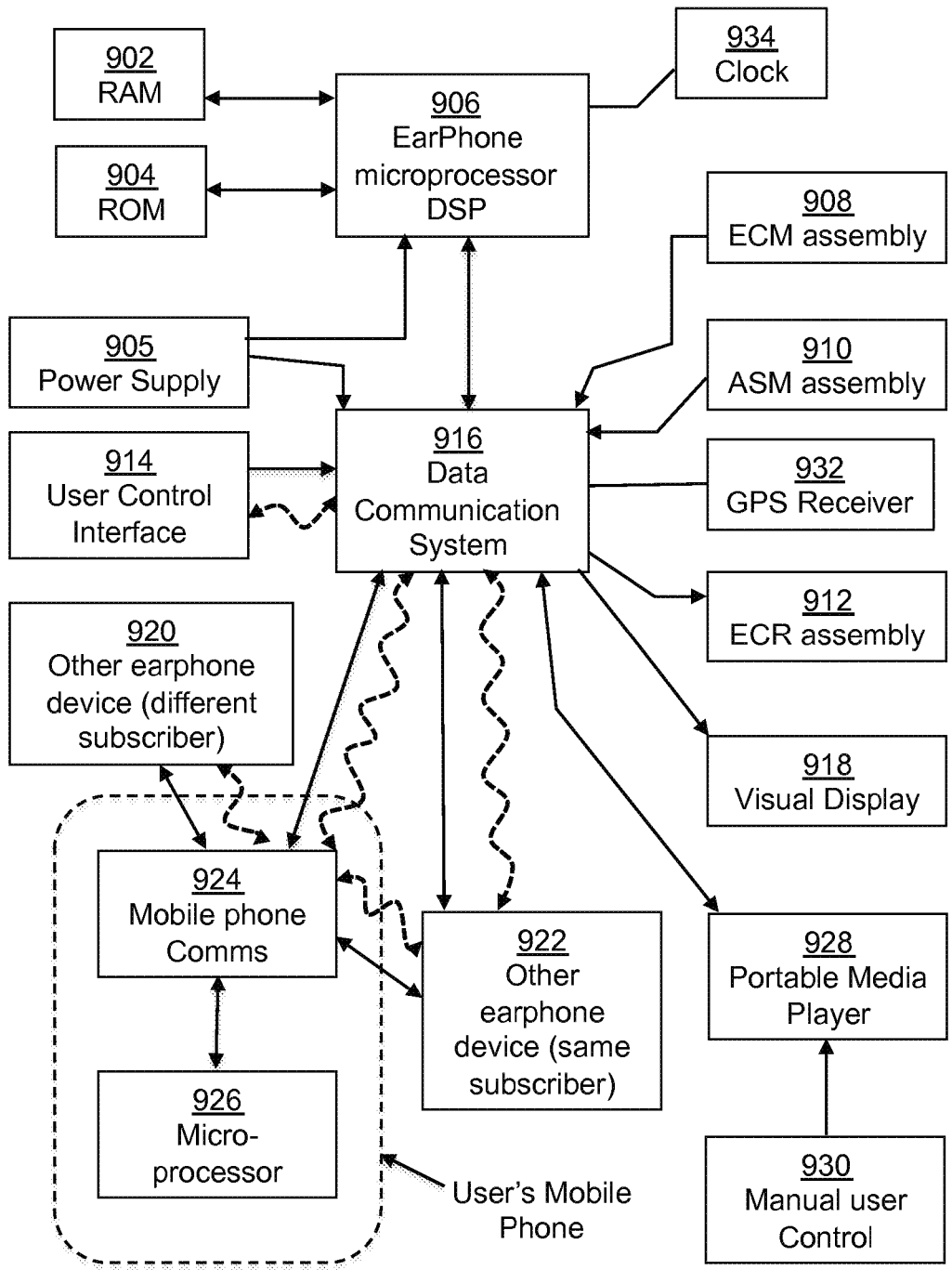
FIG. 9 illustrates a diagram of an earpiece in accordance with at least one exemplary embodiment.

FIG. 9, a block diagram of an earpiece in accordance with at least one exemplary embodiment. A power supply 905 powers components of the earpiece including microprocessor/DSP 906 (or processor 906) and a data communication system 916. As illustrated, the earpiece can include the processor 906 operatively coupled through a data communication system 916 to an ASM 910, an ECR 912, and ECM 908. Data communication system 916 may include one or more Analog to Digital Converters and Digital to Analog Converters (DAC). The processor 906 can utilize computing technologies such as a microprocessor, Application Specific Integrated Chip (ASIC), and/or digital signal processor (DSP) with associated Random Access Memory (RAM) 902 and Read Only Memory 904. Other memory types such as Flash, non-volatile memory, SRAM, DRAM or other like technologies can be used for storage with processor 906. The processor 906 includes a clock 934 to record a time stamp In general, a data communication system 916 is a communication pathway to components of the earpiece and components external to the earpiece. The communication link can be wired or wireless. In at least one exemplary embodiment, data communication system 916 is configured to communicate with ECM assembly 908, ASM assembly 910, visual display 918, and user control interface 914 of the earpiece. As shown, user control interface 914 can be wired or wirelessly connected. In at least one exemplary embodiment, data communication system 916 is capable of communication to devices exterior to the earpiece such as the user's mobile phone, a second earpiece 922, and a portable media player 928. Portable media player 928 can be controlled by a manual user control 930.

The user's mobile phone includes a mobile phone communication system 924. A microprocessor 926 is operatively coupled to mobile phone communication system 924. As illustrated multiple devices can be wirelessly connected to one another such as an earpiece 920 worn by another person to the user's mobile phone. Similarly, the user's mobile phone can be connected to the data communication system 916 of earpiece 901 as well as the second earpiece 922. This connection would allow one or more people to listen and respond to a call on the user's mobile phone through their respective earpieces.

As illustrated, a data communication system 916 can include a voice operated control (VOX) module to provide voice control to one or more subsystems, such as a voice recognition system, a voice dictation system, a voice recorder, or any other voice related processor. The VOX module can also serve as a switch to indicate to the subsystem a presence of spoken voice and a voice activity level of the spoken voice. The VOX can be a hardware component implemented by discrete or analog electronic components or a software component. In one arrangement, the processor 906 can provide functionality of the VOX by way of software, such as program code, assembly language, or machine language.

The RAM 902 can also store program instructions for execution on the processor 906 as well as captured audio processing data. For instance, memory RAM 902 and ROM 904 can be off-chip and external to the processor 906 and include a data buffer to temporarily capture the ambient sound and the internal sound, and a storage memory to save audio information from the data buffer in a compressed format responsive to a directive by the processor. The data buffer can be a circular buffer that temporarily stores audio sound at a current time point to a previous time point. It should also be noted that the data buffer can in one configuration reside on the processor 906 to provide high speed data access. The storage memory can be non-volatile memory such as SRAM to store captured or compressed audio data. The non-volatile memory could also be used to store sound signatures.

Data communication system 916 can include an audio interface operatively coupled to the processor 906 and the VOX to receive audio content, for example from portable media player 928, cell phone, or any other communication device, and deliver the audio content to the processor 906. The processor 906 responsive to detecting voice operated events from the VOX can adjust the audio content delivered to the ear canal of the user of the earpiece. For instance, the processor 906 (or the VOX of data communication system 916) can lower a volume of the audio content responsive to detecting an event such as a sound signature for transmitting the acute sound to the ear canal of the user. The processor 906 by way of the ECM 908 can also actively monitor the sound exposure level inside the ear canal and adjust the audio to within a safe and subjectively optimized listening level range based on voice operating decisions made by the VOX of data communication system 916.

The earpiece and data communication system 916 can further include a transceiver that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver can also provide support for dynamic downloading and uploading over-the-air to the earpiece. It should be noted also that next generation access technologies can also be applied to the present disclosure.

Data communication system 916 can also include a location receiver 932 that utilizes technology such as a GPS (Global Positioning System) receiver that can intercept satellite signals and therefrom determine a location fix of the earpiece. GPS receiver 932 configured operably with processor 906 can generate a geocode corresponding to a location and link the geocode to an event such as a recording or sound pressure level measurement.

The power supply 905 can utilize common power management technologies such as replaceable batteries, supply regulation technologies, and charging system technologies for supplying energy to the components of the earpiece and to facilitate portable applications. A motor (not shown) can be a single supply motor driver coupled to the power supply 905 to improve sensory input via haptic vibration. As an example, the processor 906 can direct the motor to vibrate responsive to an action, such as a detection of a warning sound or an incoming voice call.

The earpiece can further represent a single operational device or a family of devices configured in a master-slave arrangement, for example, a mobile device and an earpiece. In the latter embodiment, the components of the earpiece can be reused in different form factors for the master and slave devices.

Figure 10:
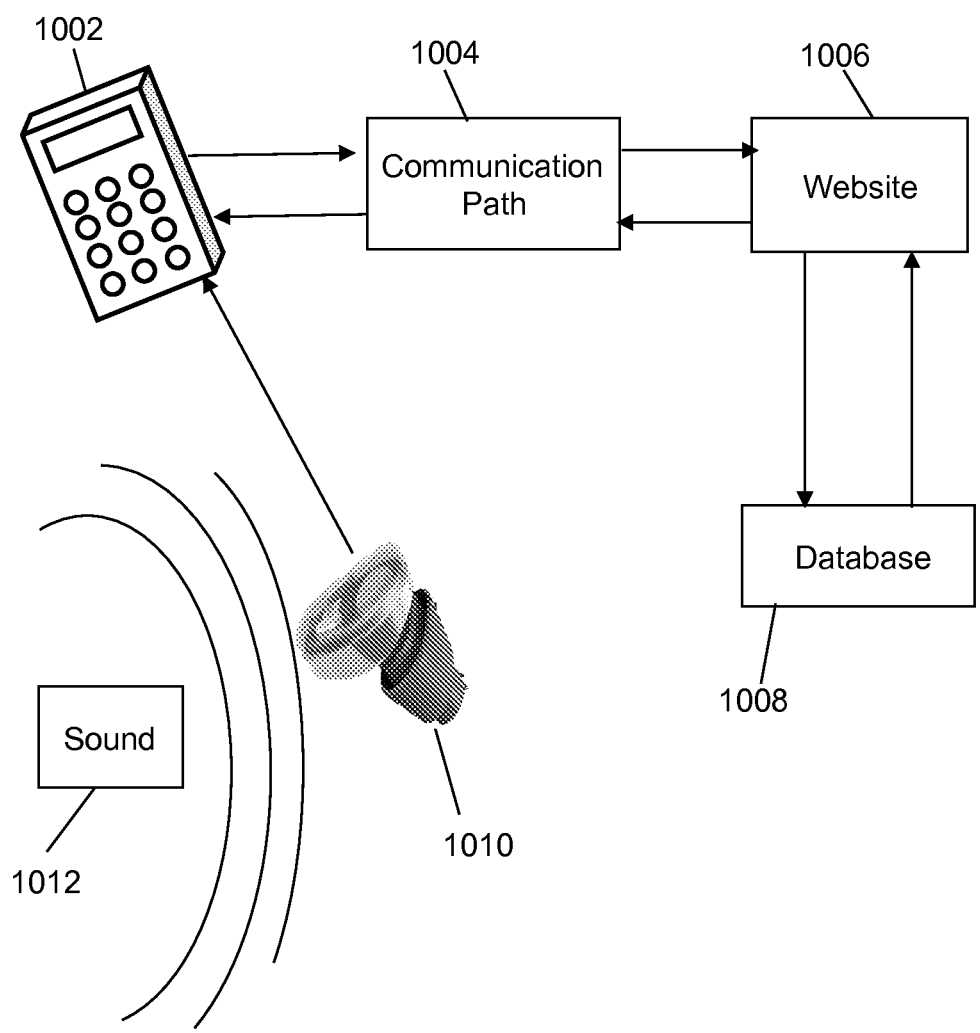
FIG. 10 illustrates a diagram of a communication device or earpiece for providing sound signatures to a sound database in accordance with at least one exemplary embodiment.

FIG. 10 is a diagram of a communication device 1002 or earpiece 1010 for providing audio content to database 1008 in accordance with at least one exemplary embodiment. Collecting a large number of sounds from around the world is a daunting task. As mentioned previously, no group or business entity would have the ability to acoustically map the world on a continuous basis. In at least one exemplary embodiment, the collection of acoustic information is achieved by mobilizing as many people as possible by making it simple to capture and provide a sound or sounds to database 1008. Furthermore, acoustic information can be collected manually using communication device 1002 and more efficiently by automating the process of collecting and sending without any human intervention.

In general, a sound signature is a sound that is collected, modeled, identified, and stored. An example of a group of related sound signatures are warning sounds such as an alarm (e.g., bell, emergency vehicle, security system, etc.), siren (e.g., police car, ambulance, etc.), voice (e.g., "help, "stop", "police", etc.), or specific noise type (e.g., breaking glass, gunshot etc.). On a global basis, the sound signatures would be different depending on geographic region. For example, a police siren in Europe is different than the United States or Asia. The number of different sound signatures that can be collected are as diverse as sound itself, from a bell clanging to a person snoring, a train, a garbage truck backing up, or the wind on Mars. In general, these sound signatures are collected by the process disclosed herein, all over the world, and at different times using a common communication device adapted to automatically collect sound, analyze the sound, determine if a sound should be saved, tagging the sound signature with metadata, and sending collected sound signatures to a database. In at least one exemplary embodiment, a Gaussian Mixture Model (GMM) of the captured sound signature could also be generated and provided.

Continuing with the example hereinabove and referring to the circuitry of FIG. 9. In at least one exemplary embodiment, communication device 1002 or earpiece 1010 having circuitry similar to FIG. 9 can store audio content or sound signatures in memory 902 for previously learned sounds from which the processor 906 refers to for detecting a similar sound. In the example above some of the stored sound signatures are warning sounds. The sound signatures can be resident in memory 902 or downloaded to communication device 1002 or earpiece 1010 via the data communication system 916 during operation as needed. Upon detecting a sound signature, in this example a warning sound, the processor 906 can take an action or response to the recognized sound signature. In this example, processor 906 can report a warning to the user via audio delivered from a transducer on communication device 1002 or earpiece 1010 (if it is being used).

In general, communication device 1002 or earpiece 1010 can monitor the environment through a microphone of each device for a sound similar to a stored sound signature. Each sound signature has certain identifiable features that characterize the sound. These features can collectively be referred to as a sound signature which can be used for recognizing the sound. As an example, the sound signature may include statistical properties or parametric properties of the sound. For example, a sound signature can describe prominent frequencies with associated amplitude and phase information. As another example, the sound signature can contain principle components identifying the most recognizable features of a sound.

Referring to FIG. 10, communication device 1002 is a mobile communication device having a microphone configured to receive sound. Examples of a communication device 1002 are a phone, cell phone, PDA, portable computer, GPS system with microphone, automobile, satellite phone, two way radio, smart phone, and an earpiece to name but a few. It is well known that these devices are used throughout the world with access on every continent. Having the ability to automatically, detect and store sounds of interest, attach key information about the stored sounds, and then upload them for storage in a database of sounds without interfering with the normal use of the device, mobilizes potentially billions of people for the collection of sounds. These sounds can then be used to the benefit of man for general knowledge, historical purposes, mapping, scientific, medical, and business to name a few that would be impossible to collect by other means.

Communication device 1002 and earpiece 1010 includes circuitry as disclosed in FIG. 9 or is adapted to perform as disclosed hereinbelow. Communication device 1002 and earpiece 1010 is operably configured for recording sound and measuring sound pressure levels. In at least one exemplary embodiment, acoustic information received from microphone of communication device 1002 or earpiece 1010 is placed in a buffer or memory where it can be analyzed. The buffer is temporary storage and allows the continuous analysis of sound received from the microphone. If nothing of interest occurs, the sound in the buffer is discarded and the next piece of sound information in the buffer analyzed.

A trigger event, which will be discussed in more detail in the next figure, is the event or decision that initiates the collection or capture of audio content (or related acoustic information (example—sound pressure level of audio content) and sending of data to database 1008. In one exemplary embodiment, the audio content is stored in memory of communication device 1002 or earpiece 1010 where it can be processed further and sent at a later time. Alternately, the audio content could be sent immediately to database 1008. The trigger event can be under user control or controlled remotely through website 1006 and database 1008.

Metadata is generated that can be used to identify aspects of the audio content, for example the trigger event (sound pressure level above a certain threshold), a time stamp of when the sound was recorded, or a geocode providing the location where the sound was recorded. A communication path 1004 can be a wired or wireless connection between communication device 1002 or earpiece 1010 for transmitting the audio content, related information, and metadata. It should be noted that the audio content is not always sent. For example, sound pressure level has utility in mapping noise levels in different geographic areas/times and may be sent with metadata (but the information intensive audio content is not sent). In at least one exemplary embodiment, communication device 1002 or earpiece 1010 automatically connects to a website 1006, server system, or database 1008 to upload the information. The audio content is uploaded where it may be reviewed further before being stored into database 1008.

As mentioned hereinabove, another measurement that can be taken by communication device 1002 or earpiece 1010 is sound pressure level (SPL). The sound pressure level measurement can be taken and sent by itself (with associated metadata) or in combination with audio content. The sound pressure level (SPL) is measured from the microphone signal through an analog circuit or more typically after the microphone signal is converted to digital and calculated using digital processing before any audio processing (such as automatic gain control, equalization, etc.) occurs within communication device 1002 and earpiece 1010.

It should be noted that acoustic information can be recorded and provided manually by the user of communication device 1002 and earpiece 1008. If a manual process were relied on, it is likely that many or most sounds would be missed and that only a segment of the potential sound signature providers would participate. In at least one exemplary embodiment, communication device 1002 or earpiece 1008 is always on, analyzing sound continuously, and storing audio content of interest. Performing the process automatically does not rely on the user of the communication device to provide information which opens a path for large numbers of acoustic information to be provided continuously. An acoustic map of the world could be generated 24 hours a day because of the large number of devices spread over all geographic regions of the world.

In at least one exemplary embodiment, the user of communication device 1002 or earpiece 1010 can manually add metadata that describes the event to aid searching and categorizing a collected sound. For example, the user can provide information that the recording is a fire truck siren New York City that is attached with the time stamp and geocode (which is automatically tagged with the acoustic information). In at least one exemplary embodiment, communication between the user of communication device 1002 or earpiece 1010 can occur through communication path 1004 requesting further information in a voice, text, or automated fashion. For example, after automatically sending sound signatures they are reviewed for format and in context to what is currently stored in database 1008. Further communication between could take place to edit, identify, describe, and format the provided captured sounds. The communication could also occur at a more convenient time or venue (example at home through a personal computer) to further place it in condition to permanently store in the database 1008. It should be noted that video information that includes audio information can also be provided in similar fashion as disclosed hereinabove. The audio information can be removed from the video and used for database 1008.

Earpiece 1010 and communication device 1002 can be operably coupled together. A priority could be set up such that earpiece 1010 is the primary recorder of sound 1012. Thus giving the collected information gives the perspective of what the user hears. Earpiece 1010 can be used with other devices for example a portable media player. Earpiece 1010 would collect, measure SPL, and tag metadata creating a queue of sounds that are uploaded when a communication path 1004 is enabled. Thus, a common device has been adapted for automatically capturing and storing sound information, measuring SPL, adding metadata including a time stamp and geocode, and uploading the acoustic information to a database thereby enabling the broadest number of people across the largest geographic area for sound collection on a continuous basis.

Figure 11:
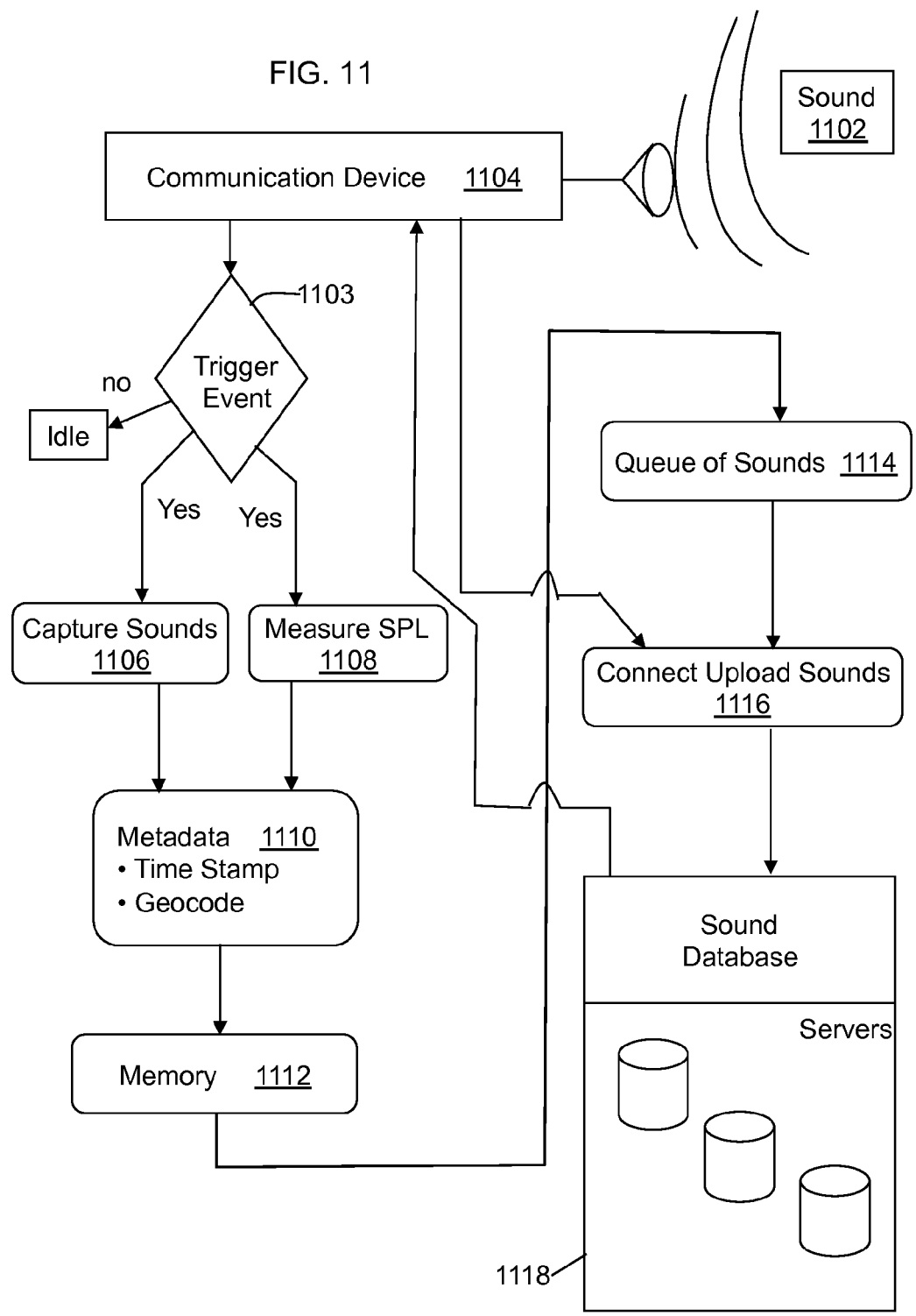
FIG. 11 illustrates a block diagram of a cell phone capturing a sound signature and providing the sound signature to a database of sounds in accordance with at least one exemplary embodiment.

FIG. 11 is a block diagram illustrating a communication device 1104 collecting or capturing acoustic information and providing the sounds in accordance with at least one exemplary embodiment. Communication device 1104 includes at least one microphone that is enabled configured to receive acoustic information. In at least one exemplary embodiment, communication device 1104 can have multiple microphones for averaging sound pressure level measurements. Moreover, people do not always keep their phone out in the open but have them on or in holsters and pockets. Multiple microphones increase the probability when automatically collecting audio content that an unobstructed microphone is available configured to receive the information.

As mentioned hereinabove, the acoustic information is stored in a circular buffer in device 1104 and continuously analyzed. For example, the acoustic information in half the buffer is analyzed while new acoustic information is loaded into the remaining half of the circular buffer. If a trigger event occurs where a sound of interest is detected, the acoustic information is stored in memory that is more permanent and not written over in the communication device 1104 until it is provided to a database configured to collect the acoustic information.

A trigger event initiates the saving of acoustic information or information related to the sound that triggered the event for uploading to a sound database 1118. A trigger event can take many forms. A sound pressure level (SPL) exceeding a certain threshold value could trigger collecting acoustic information. SPL triggered events would provide useful information for mapping SPLs throughout an area and to identify places where noise may be excessive. Alternately, a delta change in sound pressure level could trigger the storing of the sound in the buffer. For example, a spike or jump in sound pressure level that is substantially higher than the ambient SPL could trigger the storing of the sound in the buffer (for example a gun shot or explosion).

Time is another example of a trigger event. Communication device 1104 could receive and store acoustic information periodically. Periodic sampling could be used to map sound exposure of the user of communication device 1104 which will vary depending on the time of day as well as time of the year.

Geographic location is a further example of a trigger event. Communication device 1104 having a GPS receiver can identify a location with great accuracy. Communication device 1104 could trigger storing of acoustic information for a specific location. For example, the user of communication device 1104 has a trigger event that stores acoustic information when visiting his/her doctor thereby keeping a medical history of the visit. The acoustic information in this example does not have to go to sound database 1118 for general use but could go to a personally managed and secure "sound locker" that is owned by the user of communication device 1104.

Another example of a trigger event is sound signature detection. In at least one exemplary embodiment, communication device 1104 includes or has access to sound signatures. Communication device 1104 uses the sound signatures to identify similar sounds. The acoustic information is collected once a similar sound is identified from the sound signatures available to device 1104. For example, sound database 1118 is collecting sounds related to warning sounds. Database 1118 can make available sound signatures related to warning sounds to mobile communication devices when a communication path is opened to the devices. Thus, a focus is placed on collecting specific sounds automatically without requiring human intervention although both the collection and trigger event could be performed or entered in a manual process under user control. Other trigger events such as voice activation and sensor data (movement, bio-information, atmospheric data, visual, substance detection, odor, etc.) are examples of events that are used to collect acoustic information.

In at least one exemplary embodiment, a sound signature comprises a Gaussian Mixture Model (GMM). In general, A/D converters in device 1104 convert the analog sound signal to a digital sound signal. The processor chops up the digital sound signal into frames, for example, at fs=8000 Hz a 20 ms frame of data is 160 samples; each sample is represented by 16 or 32 bits (e.g., it is quantized). Thus a 1 second recorded an acoustic sound wave will be represented by 50 frames (20 ms*50=1 sec).

Each frame is then extracted for features as known in the art. The features can be Fourier series coefficients (FFT based) that represent a frequency decomposition of the frame; the features can be mel-cepstral or LPC coefficients that represent a spectral envelope decomposition. The features can be DCT, KLT, PCA, or any other feature set. Notably, the features provide an efficient form of data compression to reduce the dimensionality of the input space. (For instance, instead of using all 160 samples (16 bits/sample) to represent the frame, the mel-cepstral only requires 10-14 samples (16 bits/sample) to represent the same frame).

The features are then used to train a GMM. There is a single GMM for each sound signature. A sound signature consists of the features of the acoustic sound wave for instance, sequential frames of mel-cepstral coefficients for a recorded acoustic sound wave. The training causes the GMM to learn the statistics of the features collectively called the feature set. More specifically, the GMM represents statistical parameters of the features set, in particular, the mean, covariance, and probability weights of the features set. So, the GMM characterizes the statistics of the features set using these parameters (mean, covariance, weights). So, for example, during training, the mean of the feature set (e.g., 10-14 cepstral coeffs for each frame) is collectively determined (e.g., average the cepstral coefficients over all frames), the covariance of the features set is determined (calculate second moment of the cepstral coefficients over all frames), and the probabilities are determined (e.g., determine the frequency of occurrence of the frames with respect to the number of GMM cluster centers (e.g., mean vectors).

Once the GMM has been trained the mean, covariances, and weights fully describe the sound signature. That is, these parameters fully specify the GMM for modeling—in a pattern recognition sense—the sound signature. These parameters are then stored in memory for the particular GMM and used for reference when attempting to recognize sound signatures in ambient sound. Thus, instead of saving the entire acoustic sound waveform in memory for comparative purposes, the features are first extracted, and then a GMM is created to model the statistics of the features. The GMM is then used to recognize sound signatures of the same sound source during ambient sound monitoring.

In general, in database 1118 there will be as many GMMs as there are sounds that have been collected. Thus, there will be a GMM for a siren, another GMM for a horn, another GMM for a snore, etc. Then when the GMMs parameters (means, covars, weights) are all stored in memory, they can be later retrieved from memory to determine if a new sound signature provided by a communication device is one of the learned sounds already stored on database 1118.

Similarly, communication device 1104 having GMMs of recognized sound signatures can compare sounds received from the microphone of device 1104 to the sound signatures. More specifically, the process of recognizing a new sound signature consists of the same front-end feature extraction steps; that are, generating a feature set (e.g., frames of mel-cepstral coeffs). This features set is then passed to each GMM for assessing whether the parameters (mean, covar, weights) of the GMM are a best match to the new feature set. More specifically, the statistics of the new features set are compared in a maximum likelihood (ML) manner to the parameters of each GMM. The new feature set is effectively mapped to the parameters (means, covars, weights) of each GMM to determine which GMM is most likely to represent the features in a maximum likelihood sense, for instance employing principles of minimum distortion, smallest L-norm distance, and ML estimators. Each GMM produces a probability (for instance between 0 and 1) representing a match to the new sound signature; for instance, a GMM with a 0.1 probability output says there is a 10% probability that the sound signature corresponds to the sound associated with the GMM ('whistle GMM). A GMM with a 0.9 probability output says there is a 90% probability that the sound signature corresponds to the sound associated with the GMM ('siren GMM). Thus, the criteria for adding a sound signature to the database can vary. For example, communication device 1104 providing a sound signature with low match probability with sound signatures in database 1118 may be stored because it is unique. Conversely, a new sound signature having a relatively high match probability might be kept because of other factors such as location, time, or database 1118 is collecting sounds of that type.

Continuing with the block diagram of FIG. 11, sound information stored in the buffer of device 1104 is analyzed and a trigger event determines that the received sound should be stored. Sound 1102 can be converted to an appropriate form such as a GMM for use by database 1118 or the sound information itself can be stored in memory of device 1104. The sound pressure level (SPL) of the acoustic information is measured or calculated in a step measure SPL 1108. The measurement of a sound pressure level can be done in conjunction with a collected sound or independently (where only the SPL is kept and the sound information is discarded).

Metadata 1110 corresponding to the captured or collected sound is attached to the sound information. Additionally, the user of device 1104 can add further information prior to it being sent or later in communication with database 1118. For example, the user can manually enter metadata 1110 via a keyboard to a metadata table or can be vocal description in an attached audio stream. Metadata 1110 includes a time stamp and a geocode corresponding to the sound signature. In at least one exemplary embodiment, if the sound information is not converted to a GMM by communication device 1104 then a GMM will be generated of the sound when received by database 1118.

In at least one exemplary embodiment, the sound, sound pressure level, and metadata are stored in memory 1112 that resides on communication device 1104. A queue of sounds 1114 can be stored in memory 1112 for uploading at an appropriate time. The user can initiate uploading of the queue of sounds 1114 to sound database 1118 when a communication path is completed. In at least one exemplary embodiment, device 1104 can automatically connect to servers in sound database 1118 and upload queue of sound 1114 when a communication path is enabled without any manual intervention by the user of device 1104 thereby making it a transparent process that does not interfere with normal operation of device 1104. Although stored on database of sounds 1118, there may be an iterative process to determine if the acoustic information is in the correct format or are unique enough to be permanently stored.

Figure 12:
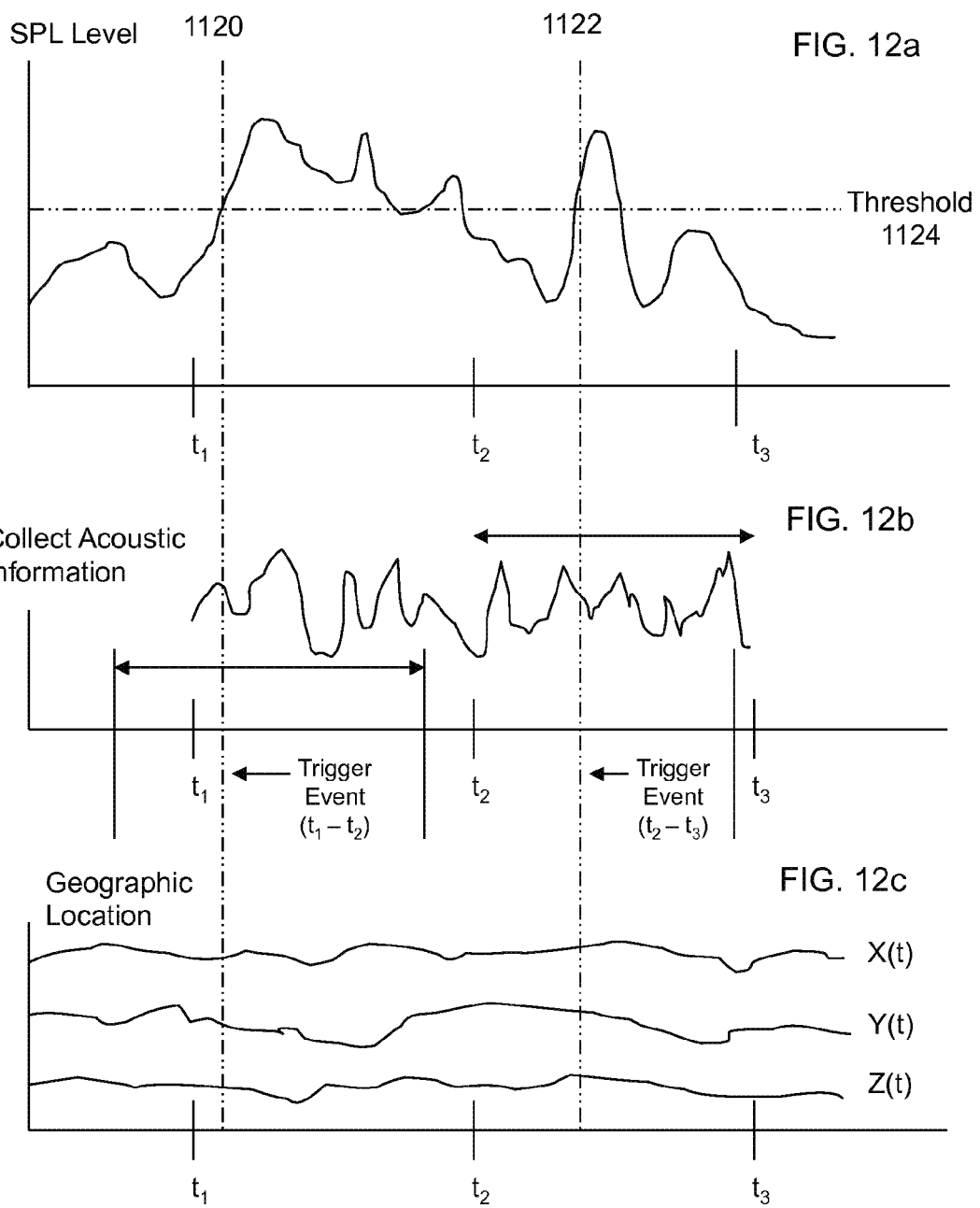
FIGS. 12a-12c are related diagrams illustrating the use of sound pressure level as a trigger event configured to collect acoustic information in accordance with at least one exemplary embodiment.

FIGS. 12*a*-12*c* are related diagrams illustrating the use of sound pressure level as a trigger event configured to collect acoustic information in accordance with at least one exemplary embodiment. FIGS. 12*a*-12*c* relate to the trigger event illustrated in FIG. 11. Referring to FIG. 11, a communication device 1104 is receiving acoustic information through the microphone of the device. In at least one exemplary embodiment, the acoustic information is stored in a buffer of communication device for analysis. The analysis includes looking for a trigger event related to sound pressure level to initiate collection of the acoustic information.

Referring to FIG. 12*a*, a graph of sound pressure level versus time is shown that is calculated by the communication device from received acoustic information. A trigger event occurs when the sound pressure level of the acoustic information exceeds sound pressure level threshold 1124. For example, information on high noise areas is being collected. Setting sound pressure level threshold 1124 at 70 dB would collect information in areas having a sound pressure level that exceeds 70 dB could produce hearing loss if exposed to this level of ambient sound. The harm to the ear is related to the sound pressure level and period of time exposed to the noise. Collecting a large number of data points would allow the mapping of acoustic information over a three dimensional region and over time. This information would have a variety of uses one of which is identifying when and where high noise occurs in a city.

In at least one exemplary embodiment, the trigger event initiates the collection of the acoustic information during a time period in which the trigger event occurs. For example in FIG. 12*a*, a first trigger event 1120 occurs where sound pressure level threshold 1124 is exceeded during a time period $t_1$-$t_2$ as indicated by the dashed line. Once triggered, the acoustic information, as shown in FIG. 12*b*, during time period $t_1$-$t_2$ is collected for sending to a database. The acoustic information can be stored in memory of the communication device in it's entirety or converted to a more compact form, modeled, characterized, and provided with metadata depending on the collection needs. Included in the metadata can the time information ($t_1$-$t_2$) and location information associated with the acoustic information. Referring to FIG. 12*c*, the position of the communication device indicated in x, y, and z coordinates versus time is indicated in the graph. The geographic information is provided with the metadata to identify where the acoustic information was collected. The position of the communication device can be static or moving over time which the information will indicate.

Similarly, a second trigger event 1122 is illustrated in FIG. 12*a*. Sound pressure level 1124 is exceeded during the time period $t_2$-$t_3$ as indicated by trigger event 1122 and the corresponding dashed line. The acoustic information, as shown in FIG. 12*b*, during time period $t_2$-$t_3$ is collected. Metadata including the time information and geographic location information will be attached with the acoustic information as described herein above.

In the example, a trigger event occurs anytime the sound pressure level threshold 1124 is exceeded. The trigger event could be modified in other ways. Examples of sound pressure level trigger events are the sound pressure level being above threshold 1124 for a predetermined time period, average sound pressure level above a predetermined threshold (over the time period), or a delta change in sound pressure level above a predetermined amount to name but a few. Furthermore, the acoustic information collected is not limited to the time period in which the trigger event occurs. The amount of acoustic information collected can be varied based on need. For example, collecting only acoustic information that exceeds sound pressure level threshold 1124. Conversely, a trigger event could collect the acoustic information from the previous, current, and next time period.

Figure 13:
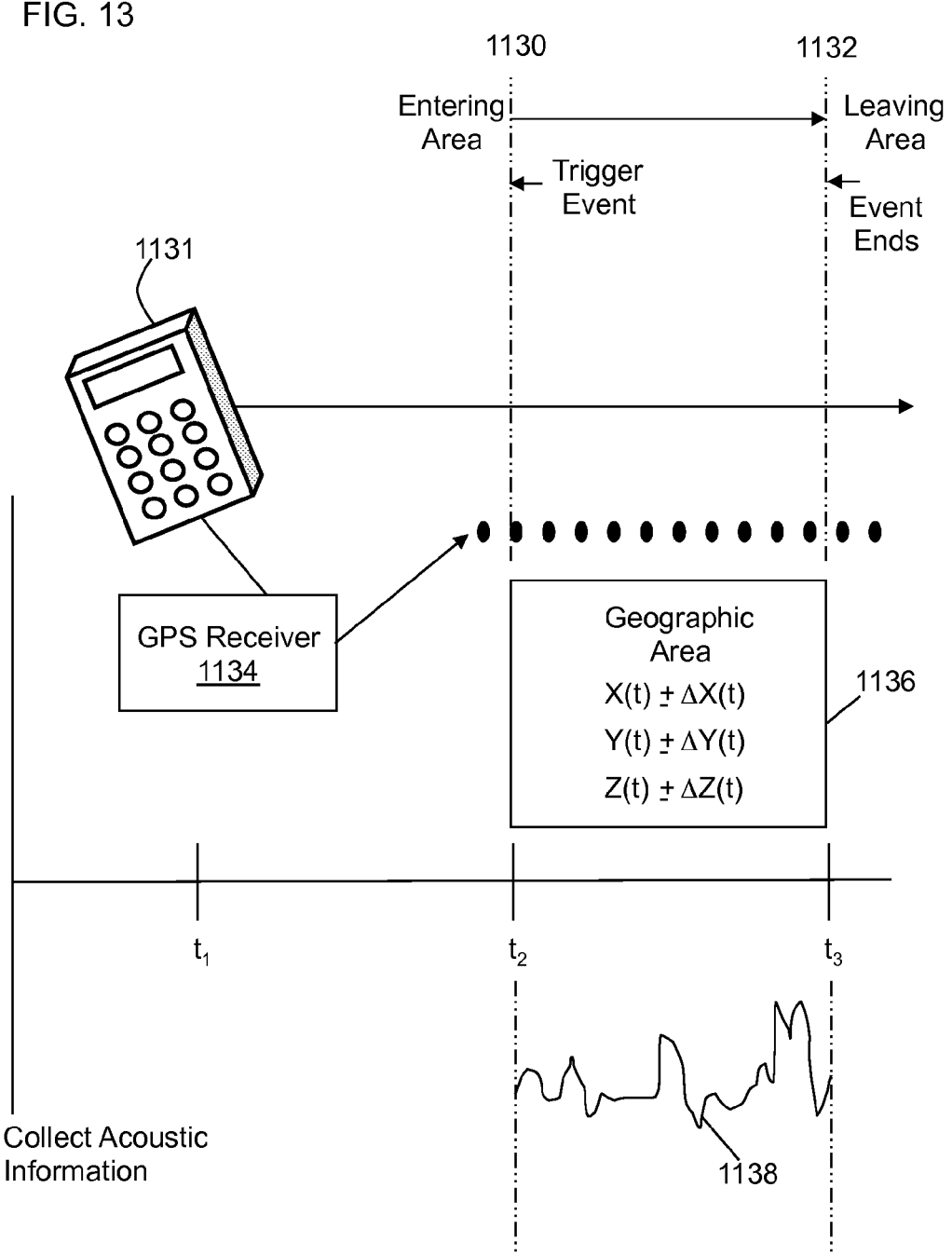
FIG. 13 illustrates a diagram of the use of geographic location as a trigger event configured to collect acoustic information in accordance with at least one exemplary embodiment.

FIG. 13 is a diagram illustrating the use of geographic location as a trigger event configured to collect acoustic information. A communication device 1131 includes a GPS receiver 1134 for providing positioning information. One or more geographic locations are stored in communication device 1131 or communication device 1131 has access to geographic locations for initiating a trigger event. Communication device 1131 compares a current geographic location with the one or more geographic locations using information from the GPS receiver 1134. A trigger event configured to collect acoustic information occurs when the current geographic location falls within one of the stored geographic locations.

A geographic area 1136 is represented by a coordinate range of $x \pm \Delta x$, $y \pm \Delta y$, and $z \pm \Delta z$. Although three dimensions are indicated in the example, a single dimension or two dimensions could be used to define an area of interest. For example, using $x \pm \Delta x$ and $y \pm \Delta y$ could be used to identify a restaurant the z coordinate would not be necessary. People going to the restaurant at different times of the day (each having their communication device triggering off of the restaurant coordinates) would collect acoustic information on the restaurant. For example, sound pressure level (SPL) measurements could be taken by a number of different people. The SPL measurements could be used to create a map of the restaurant indicating noise levels at different times of the day and in different locations of the restaurant. The information would utility to users of the restaurant, for example, wanting to know when the noise levels are low and where the most intimate (quiet) area of the restaurant is.

In at least one exemplary embodiment, a GPS receiver 1134 periodically provides information on the location of a communication device 1131. The periodicity of the received GPS information is represented by a series of black dots on the diagram. A trigger event 1130 (indicated by dashed line) occurs when the received GPS information falls within the geographic area 1136. As indicated, trigger event 1130 occurs at a time $t_2$. Acoustic information is collected while communication device 1131 is within geographic area 1136. The event end 1132 (indicated by dashed line) occurs when communication device 1131 (from received GPS information) falls outside the geographic area 1136. Event end 1132 occurs at a time $t_3$. As mentioned hereinabove, received acoustic information is stored in a buffer. The acoustic information 1138 corresponding to the time period between trigger event 1130 and the event end 1132 is collected for sending to a database. Acoustic information 1138 can be moved from the buffer to more permanent memory to be uploaded to the database at an appropriate time.

The acoustic information 1138 can be stored in memory of the communication device in it's entirety or converted to a more compact form, modeled, characterized, and provided with metadata depending on the collection needs. In at least one exemplary embodiment, acoustic information 1138 is provided with metadata that includes time information and geographic location information. The time information is provided from clock circuitry in the communication device. In the disclosed embodiment, geographic location information provided through the GPS receiver 1134 of the communication device is provided in discrete time intervals. Linear interpolation or other interpolation methodologies can be use to estimate geographic location during time periods between received data points from the GPS receiver 1134.

Figure 14:
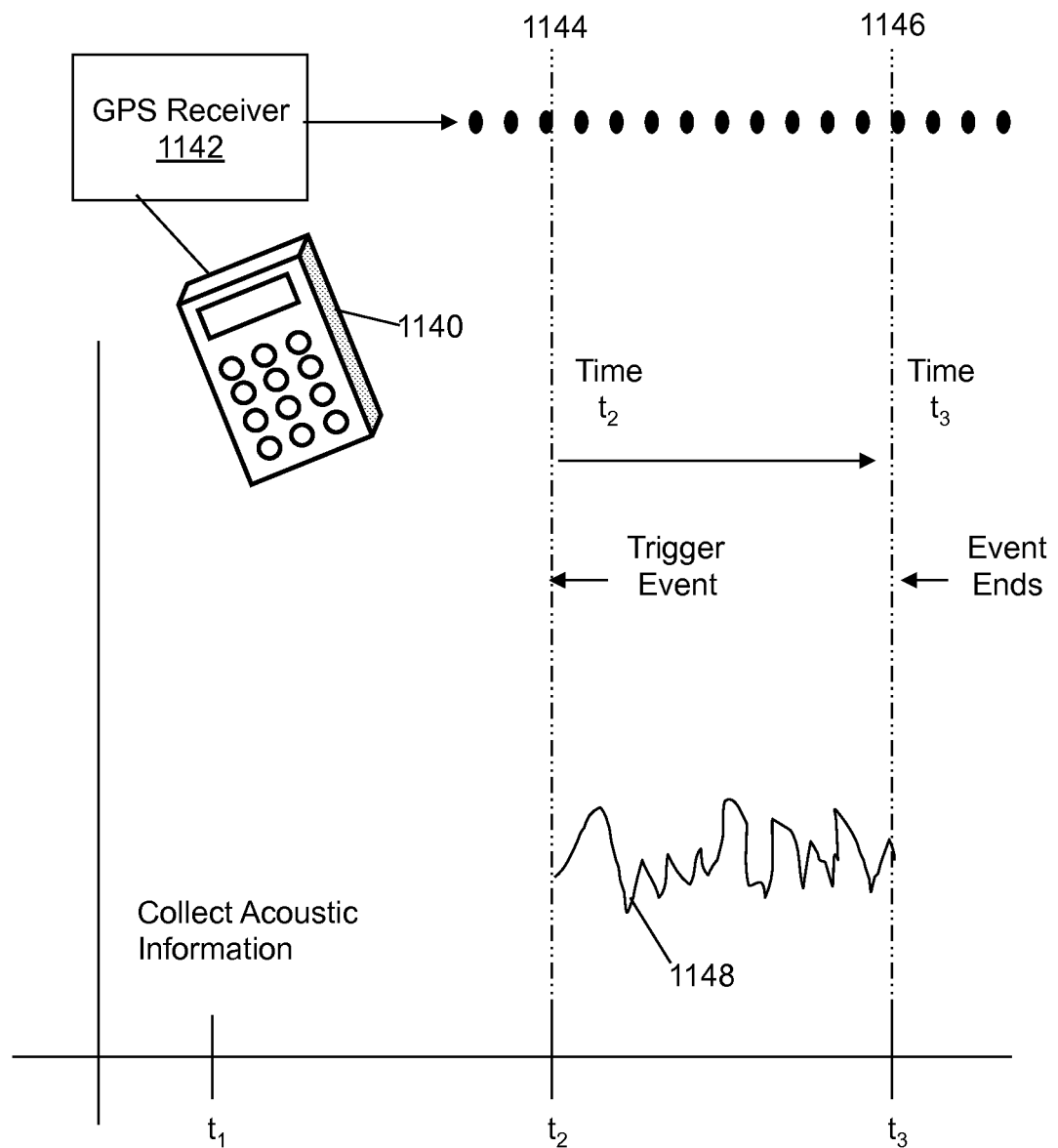
FIG. 14 illustrates a diagram of the use of time as a trigger event configured to collect acoustic information in accordance with at least one exemplary embodiment.

FIG. 14 is a diagram illustrating the use of time as a trigger event configured to collect acoustic information. A communication device 1140 includes clock for providing time information. One or more times are stored in communication device 1140 or communication device 1140 has access to times for initiating a trigger event based on time. A stored time includes an event trigger time (or start time configured to collect acoustic information) and an event end (or end time configured to collect acoustic information). Communication device 1140 compares the current time with the one or more stored times. A trigger event configured to collect acoustic information occurs when the current time corresponds to a stored event trigger time.

An event trigger 1144 configured to collect acoustic information occurs when the clock of a communication device 1140 corresponds to a time $t_2$. An event end 1146 ends the collection of acoustic information and occurs when the clock corresponds to a time $t_3$. As disclosed hereinabove, times $t_2$ and $t_3$ are stored in communication device 1140 for triggering the collection of acoustic information. In at least one exemplary embodiment, acoustic information 1148 is transferred from a buffer to a more permanent memory of communication device 1140 for uploading at an appropriate time.

In at least one exemplary embodiment, GPS receiver 1142 periodically provides information on the location of a communication device 1140. The periodicity of the received GPS information is represented by a series of black dots on the diagram. Linear interpolation or other interpolation methodologies can be use to estimate geographic location during time periods between received data points from the GPS receiver. GPS information and time information corresponding to acoustic information 1148 is provided along with other metadata. The time information is provided by the clock in communication device 1140. The acoustic information 1138 can be stored in memory of the communication device in it's entirety or converted to a more compact form, modeled, characterized, and provided with metadata depending on the collection needs.

Figure 15:
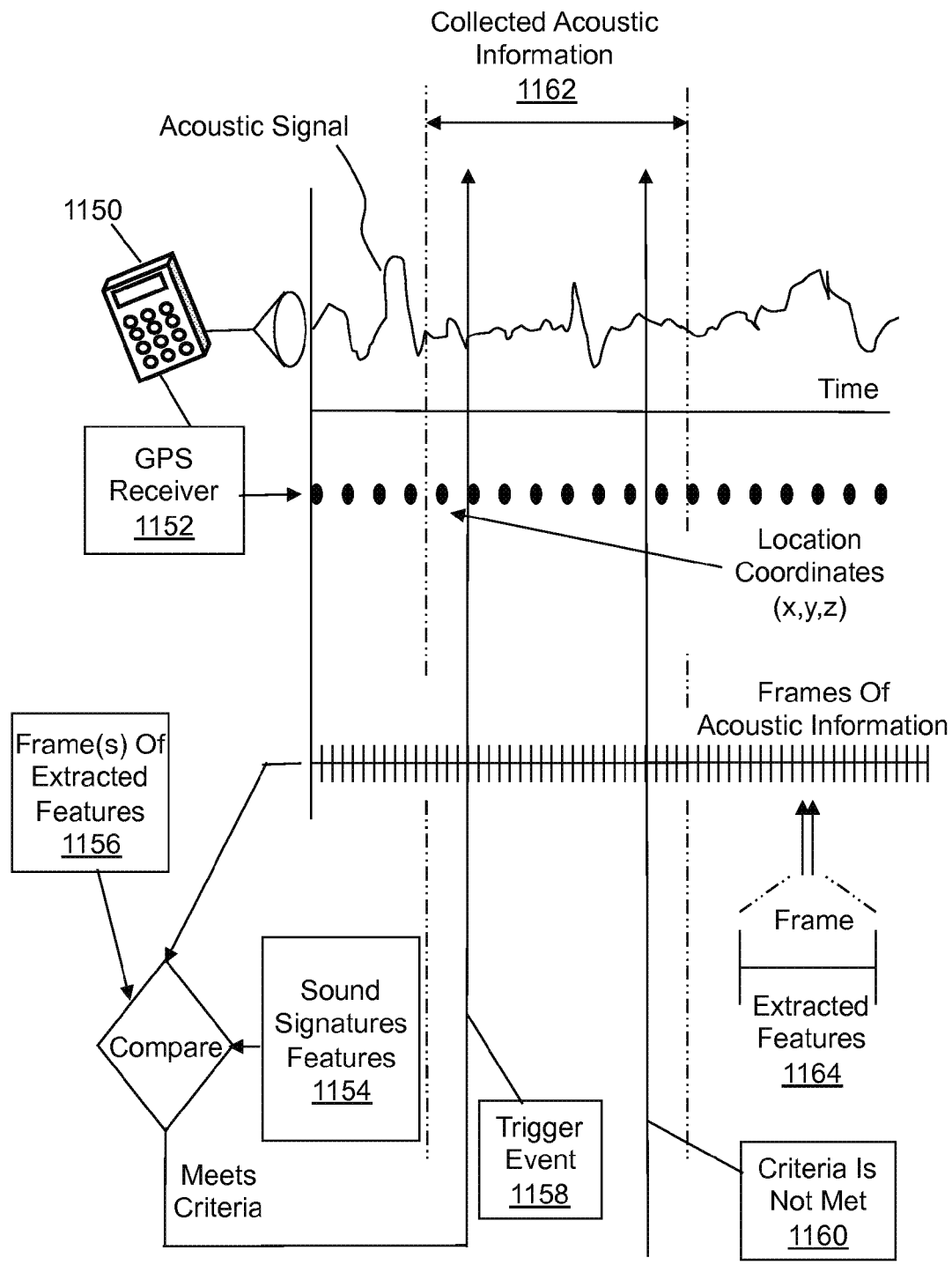
FIG. 15 illustrates a diagram of the use of sound signature detection as a trigger event configured to collect acoustic information in accordance with at least one exemplary embodiment.

FIG. 15 is a diagram illustrating the detection of a sound signature as a trigger event configured to collect acoustic information in accordance with at least one exemplary embodiment. A communication device 1150 receives acoustic information from a microphone. Communication device 1150 has in memory one or more sound signatures or has access to one or more sound signatures for comparison to acoustic information received by the microphone. The acoustic information is continuously assessed for similarities to the sound signatures. A trigger event occurs when the acoustic information is found to be similar to a sound signature. The trigger event initiates the collection of acoustic information for being provided to a database.

In at least one exemplary embodiment, acoustic information is stored in a buffer of communication device 1150 as a digital sound signal. The digital sound signal can be broken up into frames of information. For example, a frame is defined as sound information corresponding to a 20 millisecond sample at a sampling frequency of $f_s$=8000 Hz which yields 160 samples per frame. Each sample is quantized to a number represented by the bit resolution of the A/D converter (e.g. 13 bits or 24 bits) of communication device 1150. For example, a number generated by the A/D converter may represent a voltage corresponding to a voltage output of the microphone at the time of a sample.

Although not drawn to scale a series of frames is shown versus time. Each frame has digital sound information associated with it that corresponds to the acoustic information captured by the microphone. The digital sound information is processed to extract features related to the received sound. As disclosed hereinabove, the features can be Fourier series coefficients (FFT based) that represent a frequency decomposition of the frame; the features can be mel-cepstral or LPC coefficients that represent a spectral envelope decomposition. The features can be DCT, KLT, PCA, or any other feature set. Notably, the features provide an efficient form of data compression to reduce the dimensionality of the input space. For example, instead of using all 160 samples (of a single 20 millisecond frame sampling at $f_s$=8000 Hz) the mel-cepstral only requires 10-14 samples (16 bits/sample) to represent the same frame.

Associated with each frame of acoustic information are extracted features 1164. In at least one exemplary embodiment, communication device 1150 extracts the features from each frame of acoustic information and compares the features one or more sound signature occurs frame by frame. As shown a frame of extracted features 1156 of the acoustic information is compared against the GMMs of the sound signatures. In general, extracted features 1164 of a frame of acoustic information is mapped to parameters (means, covars, weights) of the sound signatures to determine which GMM has the highest likelihood of representing the features of the frame of acoustic information. The comparison yields a probability (for example between 0 and 1) of how well it matches each GMM of a sound signature. A trigger event 1158 occurs if the comparison meets the criteria, for example a probability greater than 0.8. It should be noted that the criteria can be varied and is selected to best capture or collect acoustic information that are similar or related to the sound signatures it is being compared to. The criteria set too high may yield very little collected acoustic information while setting the criteria too low may collect a substantial amount acoustic information unrelated to the sound signatures. In this example, setting the probability threshold to a level of 0.8 would trigger the collection of information if the acoustic information corresponded to the sound signature with an 80% likelihood. In at least one exemplary embodiment, the event would end when the criteria is not met 1160 as indicated on the diagram.

In at least one exemplary embodiment, collected acoustic information 1162 comprises more than the acoustic information that resides between trigger event 1158 and the time that the acoustic information no longer meets criteria 1160. Once it has been established that the acoustic information meets the criteria (above probability threshold) and should be collected, it is desirable to ensure that the entire sound is captured (not just the portion that meets the criteria). Thus, acoustic information preceding trigger event 1158 is collected as well as acoustic information after the criteria is not met. The amount of added time of the collected acoustic information pre and post can be of a fixed amount or based off of other methodologies for determining how much acoustic information to collect. In general, the time span of acoustic information to be collected is not an issue because the acoustic information is stored in a buffer and the time span of acoustic information is merely transferred to longer term memory in communication device 1150.

As disclosed hereinabove, metadata including time information and geographic information corresponding respectively to when and where the acoustic information was received. The metadata can attached to the acoustic information. A clock in communication device 1150 provides the time information. A GPS receiver 1152 provides periodic geographic location information and is indicated as a series of black dots in the figure. Interpolation can be used to estimate location between data points provided by GPS receiver 1152.

Alternately, voice activation could be used as a trigger event. For example, voice recognition circuitry in cell phone 1150 could detect words spoken by the user that initiate an action. Similarly, the detection by cell phone 1150 of a recognized phrase or group of words (in different languages) by another could initiate the trigger event. For example, scream for help or dial 911. Cell phone 1150 could send the acoustic information, time, and location to an appropriate entity in response to the trigger event.

FIG. 15a illustrates triggering using an SPL value in a frequency band. 1500 illustrates an acoustic signal, which can be analyzed in various time increments (e.g., from tb1 to tb2). The analysis can do a spectral representation (e.g., FFT) 1500A, which provides spectral information (e.g., Power spectral density PSD) that can be used as an initial trigger event. For example instead of analyzing signals for SSD continuously, which can be resource intensive, one can look for peaks in various SPL frequency bands. If the peak exceeds a threshold value, SSD analysis can be triggered to identify the signal that resulted in the SPL peak. One can look at a single or multiple frequency bands, where each can have its own threshold value. For example 1510 illustrates an acoustic temporal signal that has a pattern. Analysis between time increments tb3 to tb4 results in a spectral representation 1510A. A previously stored threshold value 1540 (e.g., 3 dB above the noise floor) in the frequency band Fmin (1520) to Fmax (1530) triggers a further SSD analysis with a time increment tc1 to tc2.

FIG. 15b illustrates a flow chart describing a triggering event using periodic signals. In accordance with another exemplary embodiment, and input acoustic signal 1547 can be analyzed 1551, to determine if there is a periodic signal 1553. If there is a periodic signal then the acoustic data needed for sonic signature detection (SSD) analysis can be extracted from a data buffer 1557. The extracted data can be used to generate sonic signature parameters (SSP) 1561 for example coefficients for a Gaussian mixture model. The SSPs calculated can be compared with stored values 1563 to determine if identification of the signal can be obtained. If the signal is identified 1565 then a stored action associated with the signal can be enacted 1567. For example if a fire alarm is identified, then attenuation can be reduced (e.g., if using an active inflation management system). If the signal has not been identified then notification can be sent 1569 identifying the signal as a new or unknown signal.

FIGS. 15c-15k illustrates various spectrogram signatures that illustrate the use of spectrograms for periodic detection in accordance with at least one exemplary embodiment. One of the possible methods of identifying periodic signals is the use of spectrograms. For example a detector can measure acoustic signals over time. The signals can be broken into a spectrogram, where a certain time fragment is converted into spectral information (e.g., PSD) and is associated with a column of pixels in the spectrogram. The columns values in the columns can be normalized so that each column of the spectrogram has the same max and min value, where the max and min range can be broken into discrete values and the column values reassigned to their respective discrete values. The normalized (or un-normalized) spectrogram over time can be analyzed to look for peaks above a threshold level. An analysis region can then be centered about the peak and re-centered taking into account additional peaks in the analysis region to derive a center of gravity of the peak regions (e.g., centerline). If it is determined or expected that the signals are speech, then temporal stretching or reduction can be enacted within an analysis region to fit signal levels above a threshold within the full extent of the analysis region (not shown). Then a correlation value can be taken between neighboring analysis regions to determine the likelihood of repeating signals.

For example FIG. 15c illustrates the word "fire" spoken by a first speaker three times in succession (e.g., Analysis region R1, R2, and R3). The distinctive pattern is evident. Upon centering/recentering, the correlation between neighboring analysis regions in FIG. 15c would be good (e.g., >0.6). FIG. 15d illustrates three different words spoken by speaker 1 "fire", "wire", and "mire" associated with analysis regions R4, R5, and R6 respectively. Upon centering one can determine the difference in the patterns and one would get a lower correlation value (e.g., <0.6) indicating a non-repetitive signal.

Figure 15G:
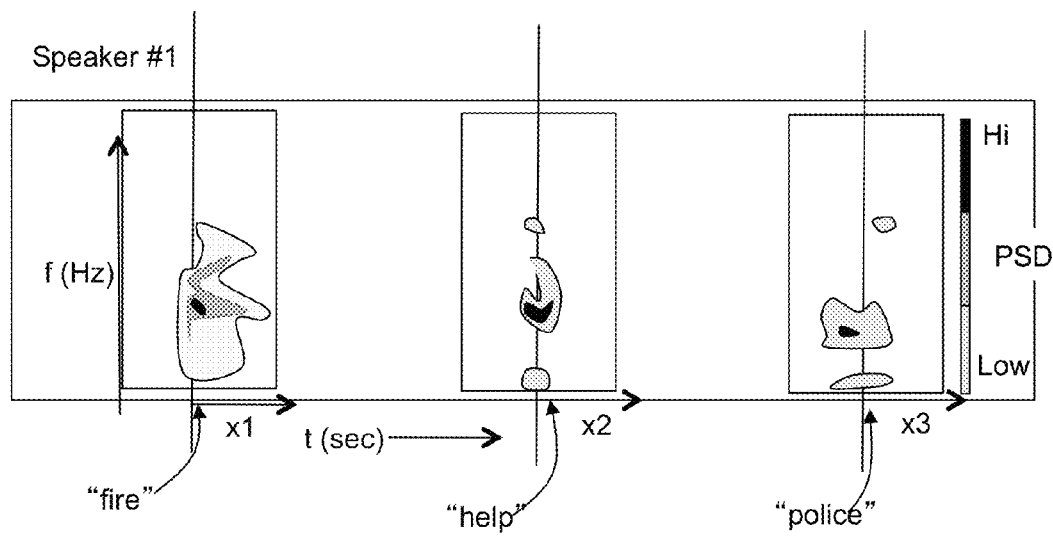
Figure 15H:
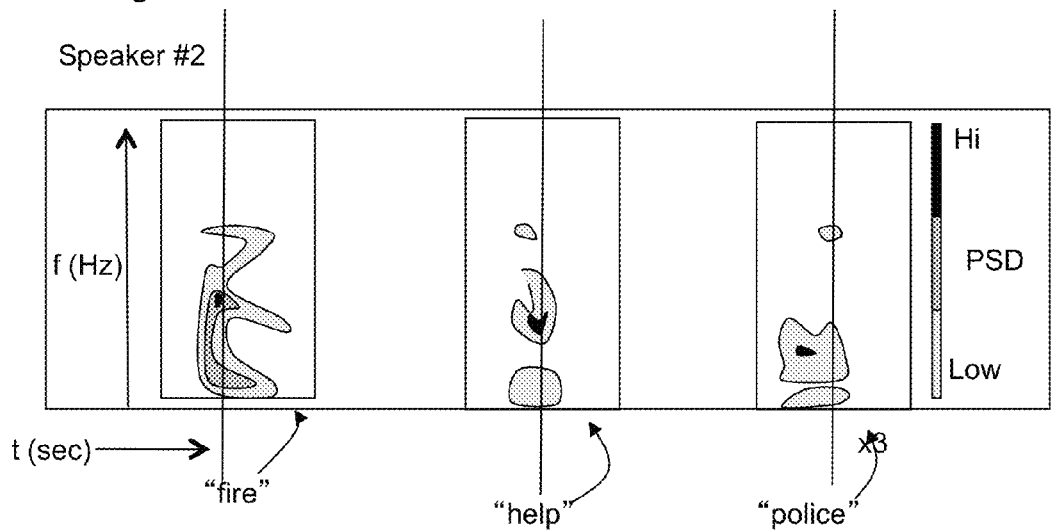

FIGS. 15e and 15f analogous with FIGS. 15c and 15d, but for a second speaker. One can note the similarity in the pattern between the word "fire" in FIG. 15e and the word "fire" in FIG. 15c. FIGS. 15g and 15h illustrate spectrograms of three various words "fire", "help", and "police" from speaker 1 and speaker 2 respectively. One can notice some of the similarity between common words regardless of the speaker.

Figure 15I:
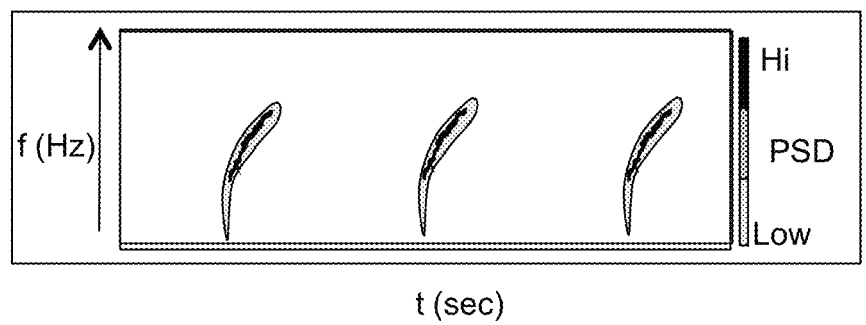
Figure 15J:
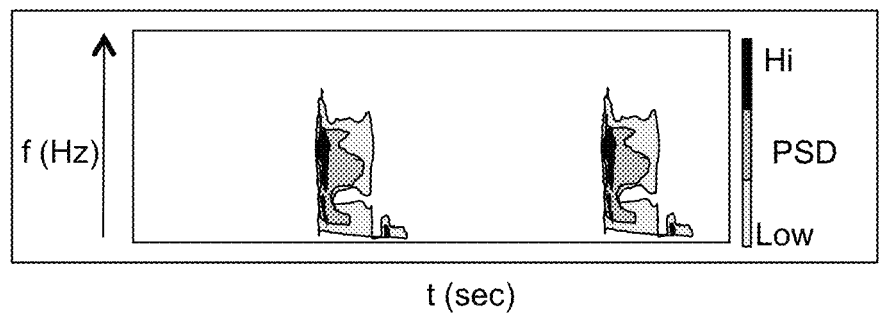
Figure 15K:
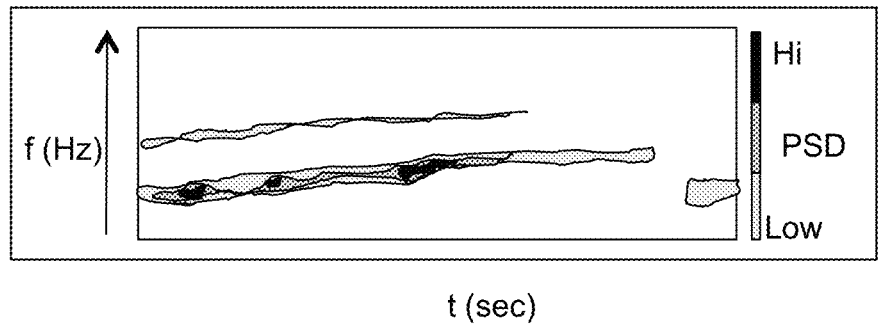

FIG. 15i illustrates spectrograms of a frequency sweep alarm, FIG. 15j illustrates spectrograms of a car horn, and FIG. 15k illustrates the spectrogram of a fire alarm. Note that a very long temporal signal can result in the necessity of increasing the analysis region width. One can see the difference between signals between FIGS. 15i, 15j, and 15k.

FIGS. 16a-16c are related diagrams illustrating the use of sensor data as a trigger event configured to collect acoustic information in accordance with at least one exemplary embodiment. Sensors and sensor data are useful in determining a trigger event configured to collect acoustic information. Examples of sensor data are acceleration and velocity, temperature, atmospheric measurements (barometric pressure, wind speed, moisture levels, etc.), odor (smell), chemical detection, biological information (heart rate, blood pressure, glucose level, etc.) to name but a few. Velocity and acceleration will be used to illustrate a trigger event but the other sensor data could be used in a similar fashion to initiate collection of acoustic material.

Referring to FIG. 16a, a graph of acceleration versus time is shown that is calculated by communication device 1170. Similarly, referring to FIG. 16b, a graph of velocity versus time is plotted in FIG. 16b. FIGS. 16a and 16b illustrates a trigger event 1172 configured to collect acoustic information when an acceleration threshold 1174 is exceeded. In at least one exemplary embodiment, information on velocity and acceleration can be provided by an accelerometer 1178 in communication with device 1170 or residing within communication device 1170. For example, the user of communication device 1170 is on a roller coaster that rapidly accelerates. The acceleration can be calculated from the rate of change in velocity measured by accelerometer 1178. Should the calculated acceleration exceed acceleration threshold 1174 acoustic information is collected. Note that such an arrangement can be used in a black box arrangement. For example in a car accident, upon identification of acceleration and/or deceleration levels that exceed threshold levels (e.g., 2 gs) the sound recording can be started and stored. It can later be accessed to provide clues for the accident.

In at least one exemplary embodiment, trigger event 1172 initiates collection of the acoustic information during a time period ($t_2$-$t_3$) in which the trigger event occurs. The collection of acoustic information is not limited to time period $t_2$-$t_3$ and can be adjusted based on what the collection need. In at least one exemplary embodiment, acoustic information is stored in a buffer and thus can be retrieved for a time span greater than the period where trigger event 1172 occurred. Conversely, acoustic information could be collected for a time less than $t_2$-$t_3$, for example, during the period where acceleration exceeds acceleration threshold 1174.

Once triggered, the acoustic information as shown in FIG. 16c, during time period $t_2$-$t_3$ is collected for sending to a database. The acoustic information can be moved from the buffer to more long term memory in the communication device in it's entirety or converted to a more compact form, modeled, characterized, and provided with metadata depending on the collection needs. The collected acoustic information could also be sent immediately from communication device 1170 to the database. Metadata aids in identifying and describing the acoustic information and trigger event. The metadata can attached with the collected acoustic information and includes time information and geographical location information. In general, a clock in communication device 1170 provides the time information or time stamp and a GPS receiver 1176 provides geographical location information or geocode where the acoustic information was received.

In general, multiple trigger events can be used in an AND or OR combination. An example of using both acceleration and biological sensor information illustrates a potential life saving application. A biological sensor is coupled to a user for monitoring vital functions of the user of communication device 1170. The biological sensor is in communication with communication device 1170 that also includes accelerometer 1178. The user is traveling in a vehicle that undergoes rapid deceleration that ultimately results in an accident. Acceleration threshold 1174 (absolute value) is exceeded and the acoustic information is analyzed by cell phone 1170 indicating a serious accident has occurred. The analysis could include sound signature detection that calculates a high probability that it is a high impact accident (including the accelerometer measurements). The biological sensor provides information on the health of the user. Communication device 1170 could automatically send the information (time, location, parameters of the accident) as well as pertinent personal medical information (medical conditions, medicines, allergies, etc.) to the police, fire department, and hospital resulting in saving minutes of time that could save the user's life. A further feature could be that a trigger event or trigger events could initiate pictures being taken or a video being taken. Moreover, if circular buffer was being employed for storing visual information it would be possible to provide visual information preceding the trigger event and after the trigger event.

As disclosed, a trigger event can be enabled by the user of the device or remotely. For example, a parent may want to enable a trigger event that sends acoustic information to the parent if the child's phone recognizes a warning signal (example gun shot), a sound pressure level is exceeded, or a geographic location is entered. The parent could enter the trigger event into the child's phone or enter it remotely to provide notification if certain events occurred.

Figure 17:
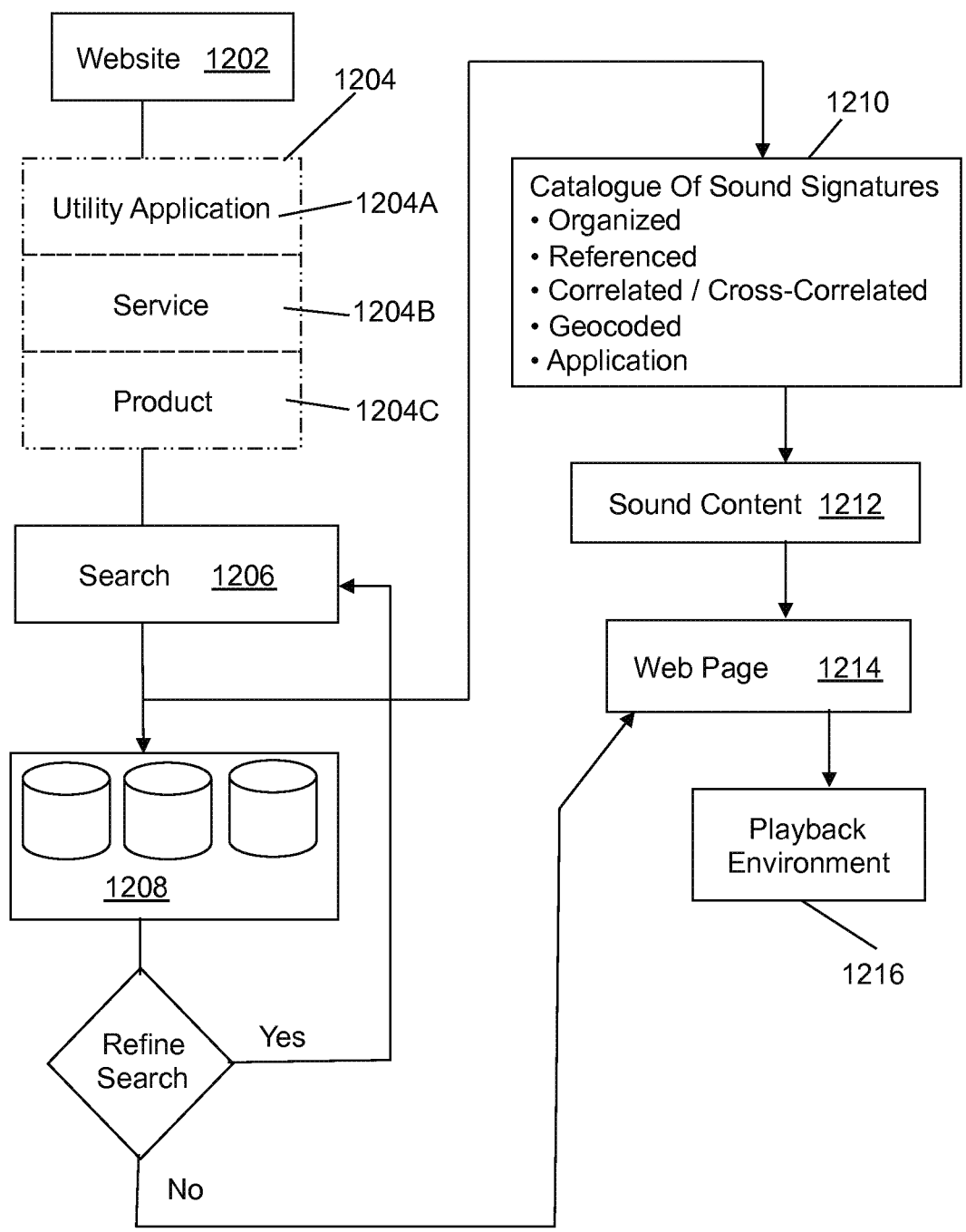
FIG. 17 illustrates a block diagram of downloading from a catalogue of sound signatures 1210 in accordance with at least one exemplary embodiment.

FIG. 17 is a block diagram illustrating downloading from a catalogue of sound signatures 1210 in accordance with at least one exemplary embodiment. As mentioned previously, there is tremendous benefit to having a database of sounds collected across the globe. For example, the database of sounds represents an accessible history of the audible environmental changes recorded for posterity. Scientists and historians could use the information for their studies. A system was disclosed herein that uses sound signature to identify similar sounds for personalized sound management applications. Similarly, the sound database would have applications to business and governments. For example, sound effects for movies or for analysis of noise levels in urban versus city environments.

Website 1202 can provide one or more web pages for individuals, governments, business, scientists, etc. for providing sound signature information for applications that provide utility, service, or product 1204 as described herein. A user or entity performs a search 1206 of sound database 1208. Catalogue of sound signatures 1210 are organized to optimize searching of this vast database. The sound signature information is referenced, correlated, cross-correlated, technically modeled, geocoded, time stamped, context, content related, application related, and others in hierarchy that allows sound signatures to be identified and found. The user can search 1206 until the appropriate item sound signature or sound pressure level is found.

Once found, sound content 1212 of one or more sound signatures as well as all information associated with the sound signatures is provided or linked to a web page 1214. A playback environment 1216 is provided for playing the sound signatures. The user may download the sound signature and information for use in their application. In at least one exemplary embodiment, depending on the application a fee may be associated with the downloading of sound signatures. For example, a movie studio wanting a collection of hundreds or thousands of gun shots and explosions would have to pay for this database of sounds.

Figure 18:
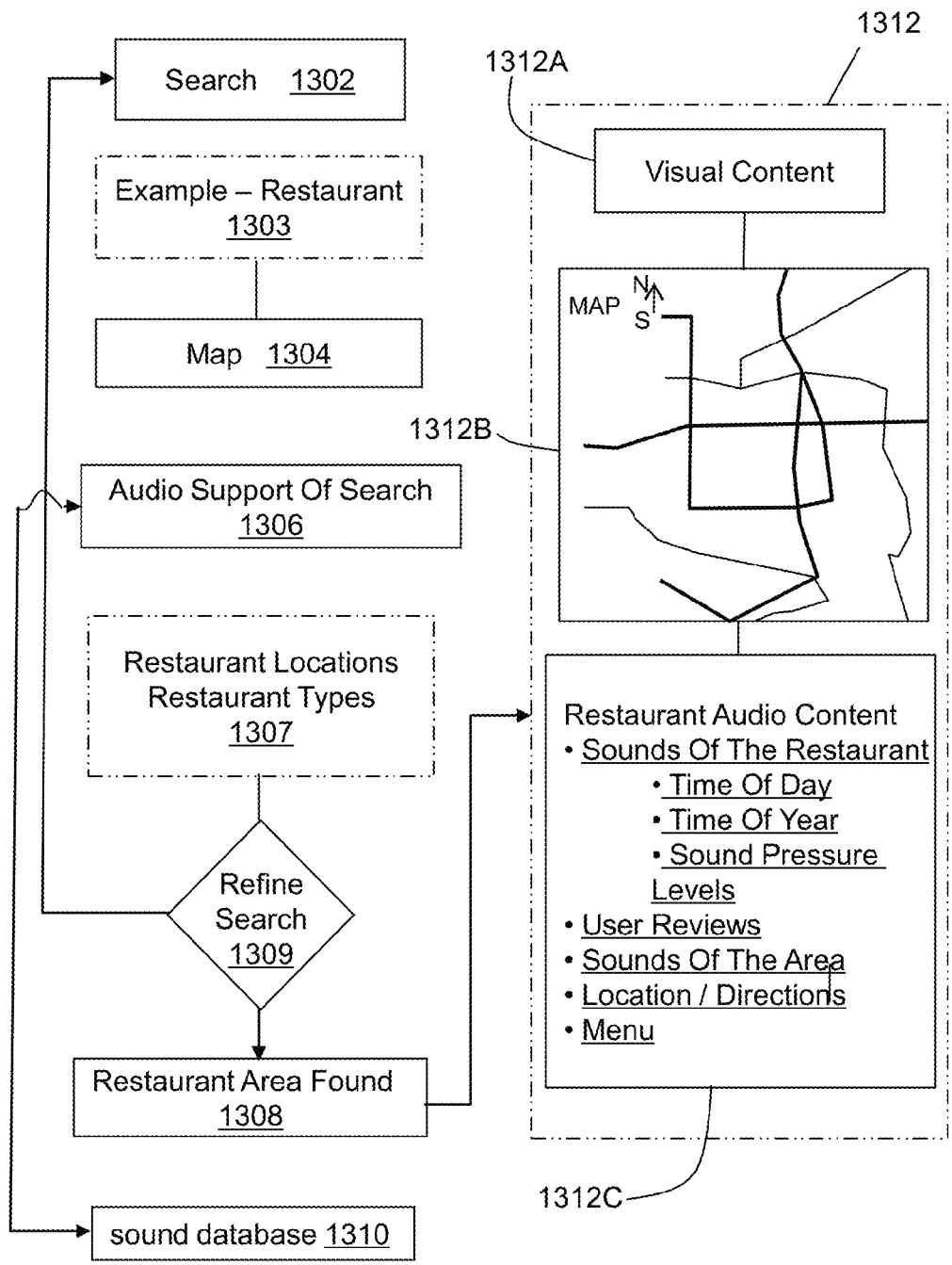
FIG. 18 illustrates a block diagram of an application where providing sound is informative and enhances a searching experience in accordance with at least one exemplary embodiment.

FIG. 18 is a block diagram illustrating an application where providing sound is informative and enhances a searching experience in accordance with at least one exemplary embodiment. Internet searches of maps bring up many different images of an area search. It can be topographical, satellite image, street map, or other types of map view. The one missing piece in many different types of searching is providing auditory feedback. For example, a search of a street map might visually tell you what the street looks like but it is a static image. Imagine if you could hear as well as see what the street looks like at different times of day. An audio experience brings an entire new dimension to this type of use.

A user can perform a search 1302 on the internet. For example, the user is traveling and is located in an unfamiliar area that he or she does not know well. It should be noted that the concept disclosed herein can be applied, in general, to a search and the specific example disclosed is for illustration purposes only. Search 1302 is for restaurants that are within walking distance from the hotel where the user is staying. The user has to criteria business proposal to be presented the next day. Search 1302 displays map 1304. This is indicated in a screen shot 1312. In at least one exemplary embodiment, the screen shot provides a map with restaurant locations. The restaurants can be listed and categorized by restaurant type to aid the user in their search.

In at least one exemplary embodiment, search 1302 comprises a search of sound database 1310. Sound database 1310 has a search hierarchy of which one is grouping restaurant information and another is location supporting an application such as map 1304. In at least one exemplary embodiment, when the user places the cursor over a specific restaurant more information is displayed. The information can be visual (picture, text) and audio from database 1310. As disclosed herein, sound information of all types is automatically and manually provided to database 1310. In at least one of the exemplary embodiments, some of the information in database 1310 relates to restaurants in the search area that has been amassed from opening to closing of each restaurant, every day of the year. Examples of information received from database 1310 are sounds of the restaurant, sound pressure levels in the restaurant, user reviews of the restaurant, sounds around the area of the restaurant, location, and menu. Thus, the user could listen to reviews by actual customers, find out signature dishes of the restaurant, or determine if the area and restaurant is too loud or noisy. For example, the user wants a quiet dinner. Information provided indicates that the restaurant has low sound pressure levels indicating a quiet atmosphere. The user checks the time period associated with the week of his/her stay and finds out that the noise levels jump up because of the influx of college students on break during this time of the year. Similarly, the user could find out that certain times are substantially more quiet (example prior to and after happy hour) and arrange his/her schedule to go during a quiet period as indicated by the information. Thus, user utility and experience is greatly enhanced by providing audio information directed to the subject of the search.

Figure 19:
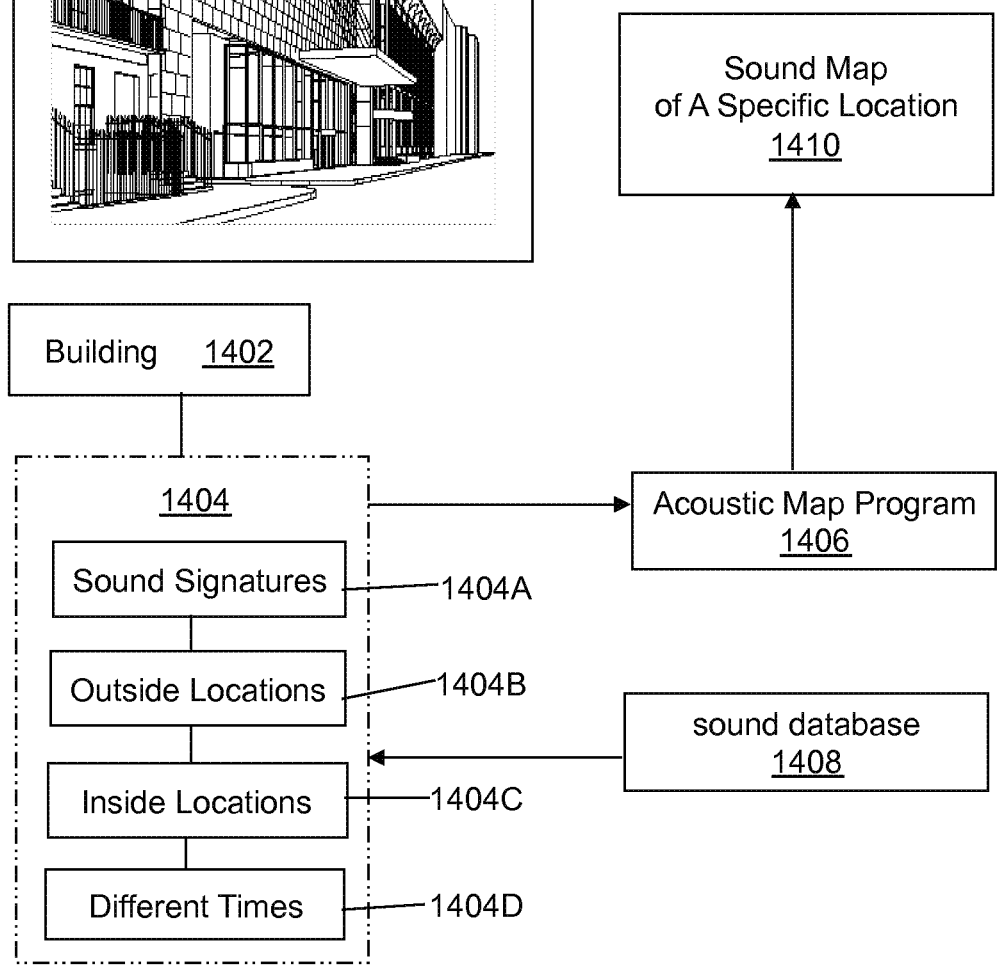
FIG. 19 illustrates a block diagram of an application of three dimensional acoustical mapping in accordance with at least one exemplary embodiment.

FIG. 19 is a block diagram illustrating an application of three-dimensional acoustical mapping in accordance with at least one exemplary embodiment. As described hereinabove, each sound signature has an associated time stamp and geocode. The geocode gives a location of each sound signature in three dimensional space. Thus, a measurement on the first floor of a building will have different coordinates than someone directly above on the second floor. Thus, a group of sound signatures can produce a three dimensional acoustic map of an area. An example would be sound pressure level variations in and around a building. Another example would be the types of sounds that are heard (e.g. horns, industrial noise, office chatter, elevator sound, etc.).

An example illustrating three dimensional acoustic mapping is of a building 1402. It should be noted that the concept disclosed herein can be applied to any type of three dimensional space and the example is for illustration purposes only. Sound signatures around the area of building 1402 have been collected automatically and manually by people who work, visit, or live in the area throughout the year. The sound signatures, sound pressure level measurements, and other acoustic information are stored in sound database 1408. A search provides information from database 1408 around building 1402, inside building 1402, at different times of the day, and at different times of the year (using time stamp information). An acoustic map program 1406 uses the acoustic information for building the sound map 1410 of the building interior and the surrounding area outside building 1402. Sound map 1410 could be displayed at different times of the day, over weeks, years, and etcetera. Visual maps can also be integrated with the 3D acoustic map providing even more information.

For example, a business wants to relocate to an area that they are not familiar with. The office they are interested in leasing is on the second floor of a building having a manufacturing facility on the first floor. Owners of the building have told them that the building is well insulated for noise. An acoustic map of the area could be generated using the sound signatures from database 1408 to investigate noise levels. The sound pressure level measurements associated with the sound signatures would be used extensively in the sound map. In this example, the sound map generated did indeed establish that the sound from the manufacturing facility was nominal but the map indicated that one side of the building suffers from substantially high wind noise during certain times of the year while another side receives substantial noise from an adjacent building. Furthermore, analysis of recordings using sonic signature detection identified train noise and motorcycle noise during certain parts of the day. Thus, the decision of the business was not to lease the building. Sound maps of other buildings were generated and used in the decision process to identify the best solution.

Figure 20:
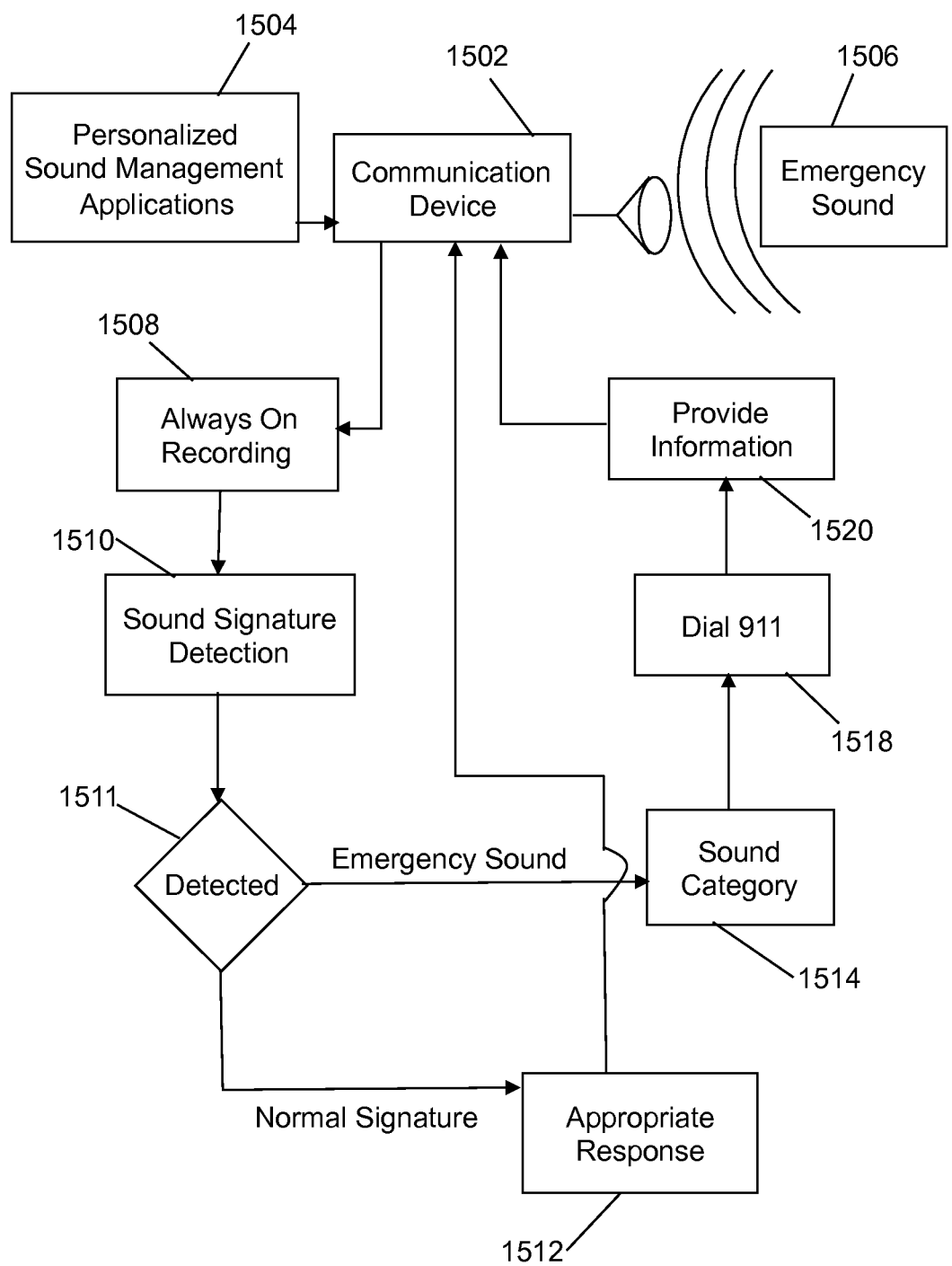
FIG. 20 illustrates a block diagram of an application for automatically providing emergency information in accordance with at least one exemplary embodiment.

FIG. 20 is a block diagram illustrating an application for automatically providing emergency information in accordance with at least one exemplary embodiment. In general, when a life threatening incident occurs time is of the essence. A communication device 1502 such as a cell phone, earpiece, personal digital assistant, smart phone, or laptop computer adapted for running personalized sound management software as disclosed in FIG. 9 for an earpiece can be used to detect a dangerous situation that should be reported to the proper authorities.

A communication device 1502 runs personalized sound management applications 1504. In particular, always on recording 1508, stores acoustic information in a buffer and continuously analyzes sound provided by the microphone of device 1502 as disclosed hereinabove. The analysis includes comparing the acoustic information to sound signatures that are stored in memory of device 1502 or through access to a library of sound signatures. The analysis is performed in a step of sound signature detection 1510. In this example, a subset of the sound signatures relate to emergency sounds.

An emergency sound is one of significance to authorities such as the police, hospital, fire department, or other authorities. Examples of emergency sounds are a gun shot, a car crash, a cry for help, an explosion, or other sound that may be life threatening or require an immediate response. The step of sound signature detection 1510 analyzes sound information received by the microphone of device 1502. If a normal sound signature is detected, a response is provided based on the personalization of applications 1504.

An emergency sound 1506 is received by the microphone of communication device 1502. Emergency sound 1506 is stored in a buffer and analyzed. The step of sound signature detection 1510 finds the sound similar to one or more sound signature emergency sounds. The sound can be put into a sound category 1514 that selects an appropriate response for the emergency sound. For example, a gun shot is detected, gun shots are in a sound category 1514 that provides a response for creating and automatically sending a report to 911. In at least one exemplary embodiment, information such as the type of gun shot, the direction of the gun shot, the distance from the communication device, when, and where the sound occurred could be supplied in a step of provide information 1520. Communication device 1502 would automatically communicate and provide information to the appropriate authorities. In the methodology described herein, multiple people at different locations could automatically provide information 1520 to the police. Acoustic mapping could be used to by the police to further determine the severity of the situation and provide a response that can save people's lives and protect the authorities that would be in harm's way.

Figure 21:
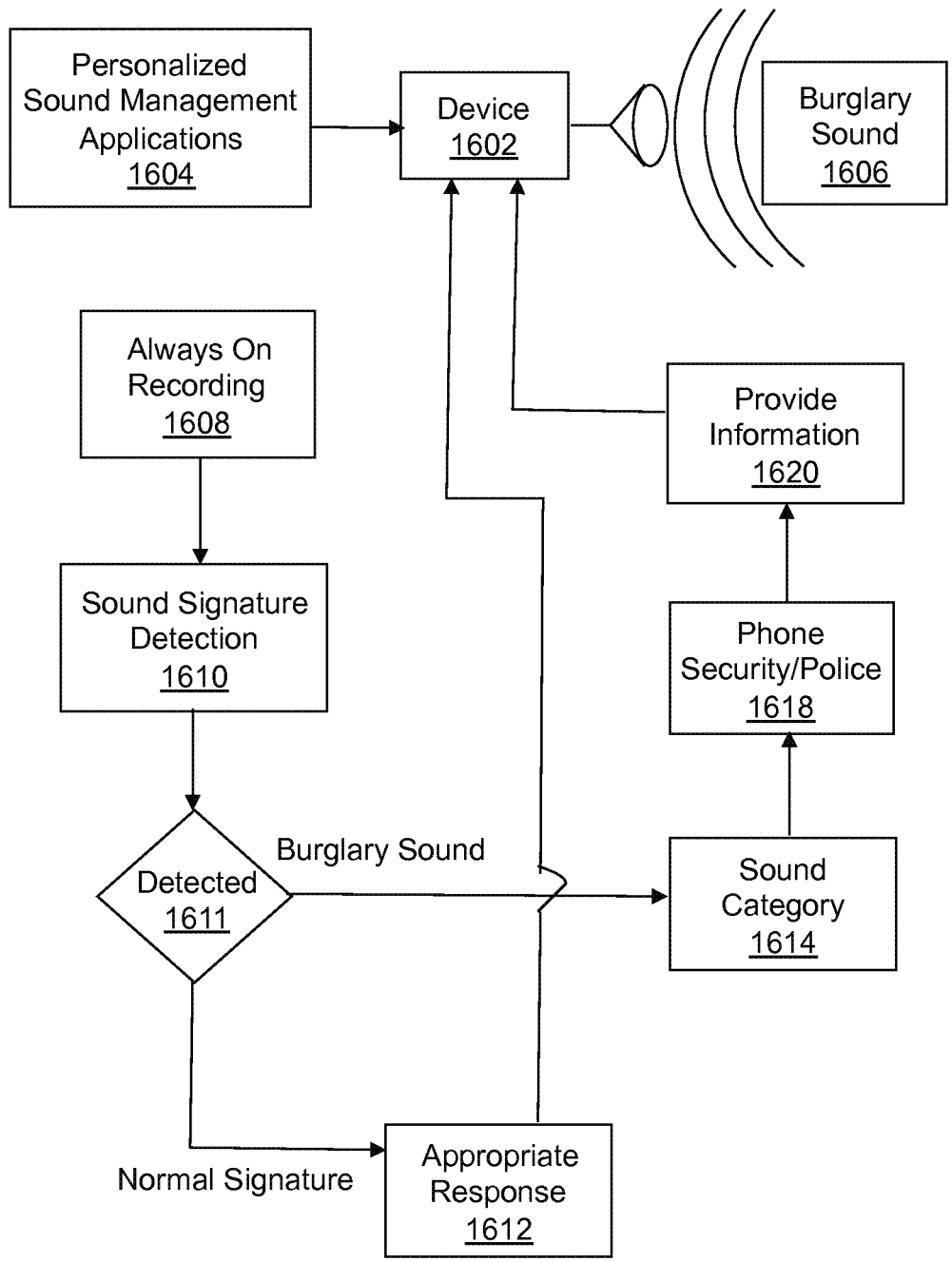
FIG. 21 illustrates a block diagram of an application for detecting a burglary, intrusion, or serious situation in a building or home in accordance with at least one exemplary embodiment.

FIG. 21 is a block diagram illustrating an application for detecting a burglary, intrusion, or serious situation in a building or home in accordance with at least one exemplary embodiment. A communication device 1602 such as a cell phone, earpiece, personal digital assistant, smart phone, or laptop computer adapted for running personalized sound management software as disclosed in FIG. 9 for an earpiece can be used to detect a burglary, intrusion, or other serious situation in the home that should be reported to the proper authorities. Similarly, a device using sound signature detection could be built for the specific purpose of monitoring a home.

A communication device 1602 runs personalized sound management applications 1604. In particular, always on recording 1608, stores acoustic information in a buffer and continuously analyzes sound provided by the microphone of device 1602. The analysis includes comparing the acoustic information to sound signatures that are stored in memory of device 1602 or through access to a library of sound signatures. The analysis is performed in a step of sound signature detection 1610. In this example, a subset of the sound signatures relate to sounds corresponding to home intrusion or other serious event such as a fire.

A burglary sound 1604 is used as an example of device 1602 detecting and responding to the sound. Examples of a burglary sound are the sound of shattering glass to gain entry, sounds of someone trying to open windows (window rattling), or the rapid opening and closing of cabinet doors to name but a few. The step of sound signature detection 1610 analyzes sound information received by the microphone of device 1602. If a normal sound signature is detected, a response is provided based on the personalization of applications 1604.

In the example, a burglary sound 1606 is received by the microphone of device 1602. Burglary sound 1606 is stored in a buffer and analyzed. The step of sound signature detection 1610 finds the sound similar to one or more sound signature burglary sounds. The sound can be put into a sound category 1614 that selects an appropriate response for the burglary sound 1604. For example, a sound similar to a window breaking is detected by device 1602 which also knows that the geographic location of device 1602 corresponds to the home of the device owner. The sound of window breaking is in a sound category 1614 that provides a response for creating and automatically sending a report to the local security in the housing complex. In at least one exemplary embodiment, information such as the type of window breakage, the direction of the window breakage, the distance from of the device 1602 from the window breakage, when, and where the window breakage occurred could be supplied in a step of provide information 1620. Communication device 1602 would automatically communicate and provide information to the appropriate authorities. In this example, local security to the complex would be notified and could drive out and determine if something is amiss. Similarly, the police could be contacted and they could send someone in the vicinity to check the property out.

Figure 22:
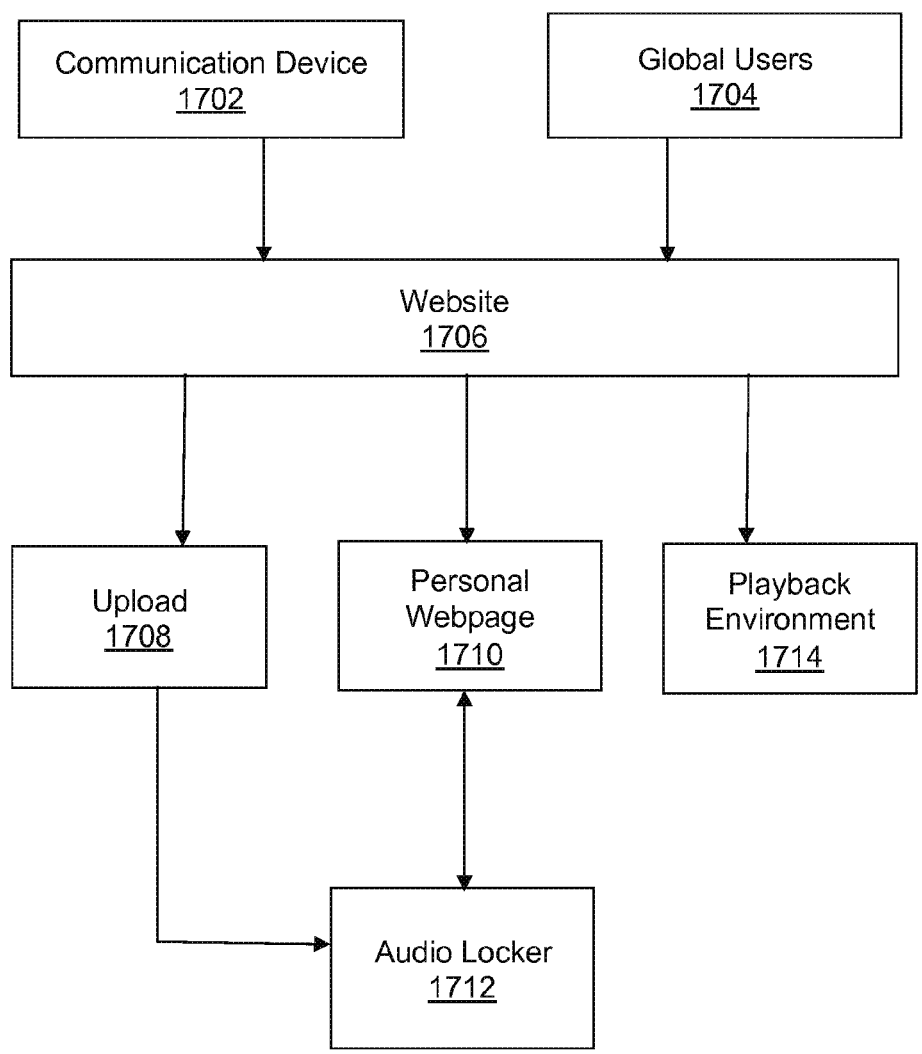
FIG. 22 illustrates a diagram of a website including a personal webpage for socialization having an audio locker in accordance with at least one exemplary embodiment.

FIG. 22 is a diagram illustrating a website 1706 including a personal webpage 1710 for socialization having an audio locker 1712 in accordance with at least one exemplary embodiment. Participants in using devices for sound capture will also be capable of tagging and cataloging these sounds based on their preferences for the purpose of social collaboration. Pre-established audio lockers will be available through an online interface with customizable lockers definable by the community. For example, website 1706 provides an environment for socialization. Users of website 1706 can have a personal webpage 1710 that includes an audio locker 1712 that is secure and under user control. Other website users will not have access to audio locker 1712 which is password protected. Audio locker 1712 is for personal use in storing personal audio information, from communication device 1702.

Communication device 1702 can be used to create an audio biography of the user. In at least one exemplary embodiment, device 1702 receives and stores audio information that is an audio record of the user's day. In an upload step 1708, device 1702 is connected to the user audio locker 1712 on website 1706 or though a user system (e.g. personal computer) for uploading audio information stored of the day's events. The user can edit or create clips of the audio information through the playback environment on the website. Audio information that the user desires to share with the public can be posted on the user personal webpage 1710. Global users 1704 of website 1706 can access the personal web page of the user and listen to the audio biographical information provided by the user through playback environment 1714. An example of personal webpage 1710 audio contents provided by the user for socialization is illustrated below:

On this day . . . .
  Important events—Sporting, Party, Truck Show, Parade, Skeet shoot
My home—morning, dinner time, weekends
My street—my yard, street corner
My favorite places—restaurant, park
My noisiest places—local construction, subway/train station, airport
My entertainment—street events, concerts, video arcade, gun range
My commute
My last adventure
My favorite sounds
My least favorite sounds
You have to hear this These content segments will allow for the user to publish through applications to their online social sites, start discussions in open and closed communities, and overlay their geocoded and time stamped sounds on $3^{rd}$ party mapping programs. Collected sounds could also be linkable into recommendation and rating engines (XYZ restaurant at 6:30 on Wednesday night) that provide public input on various venues. Thus, the collection of biographical audio information could have significant social impact in linking people to one another, creating topics of discussion that is based on audio segments, and in general enhance the experience of using a socialization website.

In an alternate exemplary embodiment, website 1706 provides socialization between grandparents and grandchildren allowing interactive or delayed communication. For example, personal webpage 1710 is associated with a specific grandparents and grandchildren. Personal webpage 1710 is a secure user space with an owner specifying the users (grandparents and grandchildren) having access. More than one audio locker 1712 can exist within personal webpage 1710 or audio locker 1712 can be partitioned with more than one secure and specific access areas.

Audio locker 1712 is a safe storage area for audio information as well as other information such as videos or pictures. Grandparents and grandchildren can use it as a repository for posting audio information for fun or communication allowing for continuous interaction. Communication device 1702 can be used to provide audio information via an upload 1708 to audio locker 1712. Audio locker 1712 can be a conduit for children to send audio messages to their grandparents that they may normally have difficulty asking. For example, grandchildren can place an audio wish list of presents they want for their birthday in audio locker 1712 or the audio wish list can be placed in a secure area of personal webpage 1710 for review by the corresponding grandparent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic device configured to collect acoustic information, comprising:
   at least one or more processors; and
   a non-transitory computer readable medium communicatively coupled to the at least one or more processors, the execution of the instruction by the at least one or more processors causing the at least one or more processors to perform operations comprising:
      collecting acoustic data by a microphone communicatively coupled to a mobile device;
      analyzing the acoustic data for a sound signature;
      tagging the sound signature with metadata;
      sending the sound signature with metadata to an acoustic database;
      associating sounds within the acoustic data with information;
      presenting the information on a map on the mobile device; and
      accessing at least audio from the acoustic database when a cursor is placed over a specific location on the map corresponding to captured ambient sounds from a geographic location and wherein acoustic information can be retrieved corresponding to the geographic location and for different selected periods of time.

2. The electronic device of claim 1, wherein acoustic information can be retrieved corresponding to the geographic location and for different selected times of a day or for different selected times of a year.

3. The electronic device of claim 1, further comprising audibly presenting the audio from the acoustic database when placing the cursor over the specific location on the map corresponding to the geographic location and representative of the captured ambient sound collected at the specific location.

4. The electronic device of claim 1, wherein the information on the map is visual information and wherein the electronic device is further configured for searching audio content associated with the map related to the visual information where the searching includes downloading or streaming media to the mobile device for analysis of the audio content.

5. The electronic device of claim 1, where the map comprises at least a picture or text and where the metadata includes at least time information or location information when the acoustic data was collected.

6. The electronic device of claim 1, further comprising searching the acoustic database for acoustic information related to a topic, and providing information posted with the location information corresponding to the map related to the topic including time information.

7. The electronic device of claim 1, further comprising:
   storing the acoustic data as an audio record of at least a portion of a user's day;
   uploading events in the audio record determined in the user's day; and
   sharing the audio record of events for social networking.

8. The electronic device of claim 1, further comprising storing the acoustic data as an audio segment and linking discussion topics on the audio segment across social websites.

9. The electronic device of claim 1, wherein the step of collecting comprises automatically and continuously capturing acoustic data responsive to the trigger event by the microphone communicatively coupled to the mobile device and wherein the step of presenting comprises presenting a topic associated with the acoustic data and the map.

10. The electronic device of claim 1, wherein the different selected periods of time correspond to sample frames of information.

11. The electronic device of claim 1, wherein the one or more processors further to perform operations comprising at least one of storing the acoustic data or metadata temporarily or storing the acoustic data or metadata permanently.

12. An electronic device configured to collect acoustic information, comprising:
   at least one or more processors;
   a location module operatively coupled to the one or more processors and configured to determine a location of the electronic device;
   a transducer operatively coupled to the one or more processors and configured to receive acoustic data; and
   a non-transitory computer readable medium communicatively coupled to the at least one or more processors, the execution of the instruction by the at least one or more processors causing the at least one or more processors to perform operations comprising:
     collecting acoustic data via the transducer;
     analyzing the acoustic data for a sound signature;
     tagging the sound signature with metadata;
     sending the sound signature with metadata to an acoustic database;
     associating sounds within the acoustic data with locations on a map; and
     accessing at least audio from the acoustic database when a cursor is placed over a specific location on the map corresponding to captured ambient sounds from a geographic location and wherein acoustic information can be retrieved corresponding to the geographic location and for different selected periods of time.

13. The electronic device of claim 12, wherein the transducer is a microphone.

14. The electronic device of claim 12, wherein the execution of the instruction by the at least one or more processors further causes the at least one or more processors to perform operations comprising searching for content in the map related to the sounds responsive to voice activation of spoken words.

15. The electronic device of claim 12, wherein the execution of the instruction by the at least one or more processors further causes the at least one or more processors to perform operations comprising searching for content from an acoustic map of the world for a selected period of time of a day.

16. The electronic device of claim 12, wherein the execution of the instruction by the at least one or more processors further causes the at least one or more processors to perform operations comprising storing acoustic information in a secure sound locker.

17. The electronic device of claim 12, wherein the execution of the instruction by the at least one or more processors further causes the at least one or more processors to perform operations comprising linking topics on the map across social websites including an overlay of geocoded and time stamped sounds on the maps representative of the captured ambient sounds from the geographical locations.

18. A method of collecting acoustic information, comprising:
   collecting, by a server, acoustic data via a microphone communicatively coupled to a mobile device;
   analyzing sounds within the acoustic data for a sound signature;
   tagging the sound signature with metadata;
   storing the sound signature with metadata to an acoustic database;
   associating sounds within the acoustic data with information on a map; and
   providing access to at least audio from the acoustic database responsive to a signal corresponding to when a cursor is placed over a specific location on the map corresponding to captured ambient sounds from a geographic location for different selected periods of time.

19. The method of claim 18, wherein the different selected periods of time correspond to one or more of a selected time of a day, a selected time of a year, or a selected frame of information.

20. The method of claim 18, wherein the map comprises a real-time three-dimensional acoustic map that is produced or updated using searchable sound content including real-time acoustically mapped information from the geographical location.

* * * * *